United States Patent [19]
Baltazar et al.

[11] Patent Number: 5,359,814
[45] Date of Patent: * Nov. 1, 1994

[54] SYSTEM FOR GRINDING A WORKPIECE

[75] Inventors: Lawrence C. Baltazar, Schenectady; Robert J. Buck, Ballston Lake; David W. Davis, Loudonville, all of N.Y.

[73] Assignee: Constant Velocity Systems, Inc., Ballston Spa, N.Y.

[*] Notice: The portion of the term of this patent subsequent to Mar. 30, 2010 has been disclaimed.

[21] Appl. No.: 971,482

[22] Filed: Nov. 4, 1992

Related U.S. Application Data

[63] Continuation of Ser. No. 658,178, Feb. 20, 1991, Pat. No. 5,197,228, which is a continuation-in-part of Ser. No. 367,890, Jun. 19, 1989, abandoned.

[51] Int. Cl.$^5$ ............................................. B24B 48/00
[52] U.S. Cl. ............................................ 451/5; 451/11; 451/27; 451/449
[58] Field of Search .......... 51/165.71, 165.77, 165.93, 51/266, 267, 272, 101 R, 216 ND

[56]  References Cited
U.S. PATENT DOCUMENTS

| | | | |
|---|---|---|---|
| 3,693,297 | 9/1972 | Cann | 51/101 R |
| 4,115,956 | 9/1978 | Hoffman | 51/96 |
| 4,657,068 | 4/1987 | Peltz | 51/266 |
| 4,943,368 | 7/1990 | Gilbert et al. | 51/425 |
| 5,593,444 | 6/1986 | Kavthekar | 51/281 |

Primary Examiner—M. Rachuba
Attorney, Agent, or Firm—Howard J. Greenwald

[57] ABSTRACT

A machine for regrinding components of a constant velocity universal joint is disclosed. The machine contains (1) a chuck mechanism and an adaptor for mounting a component in the chuck mechanism, (2) a grinding bit comprised of a grinding tip, an arbor, and means for removably attaching the grinding tip to the arbor, (3) a rotatable support means for supporting the chuck mechanism, (4) a high speed spindle, (5) a means for adjusting the position of the spindle in the Y axis to move the spindle in and out, (6) means for injecting nonaqueous lubricant onto the grinding bit, and (7) means for purifying contaminated nonaqueous lubricant.

10 Claims, 22 Drawing Sheets

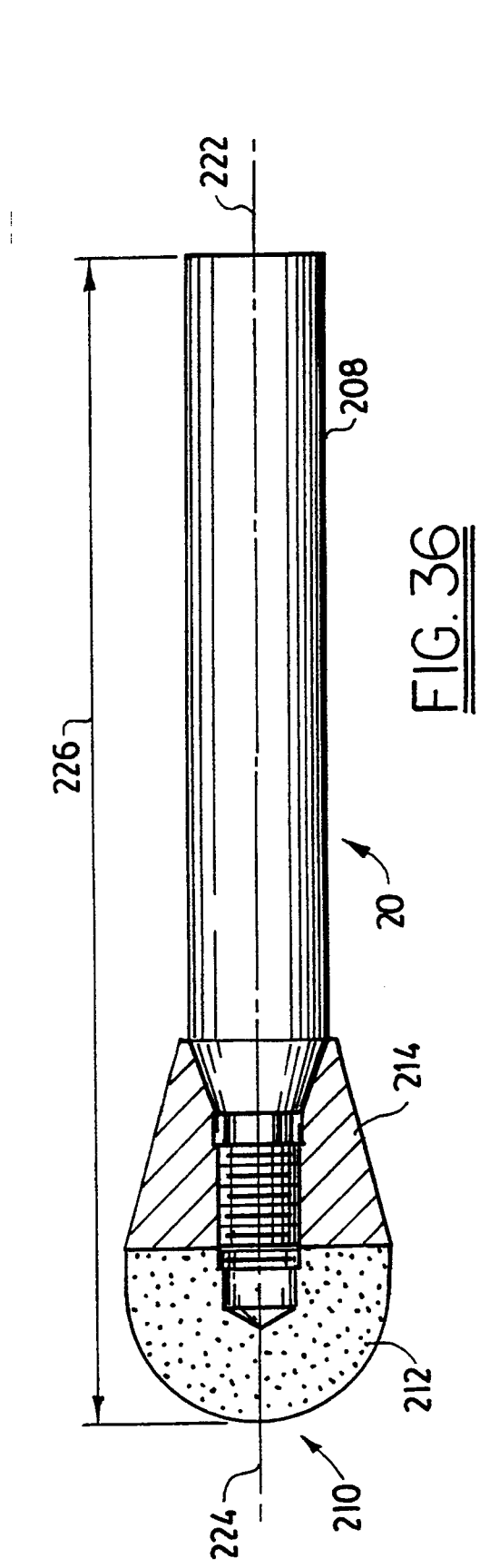
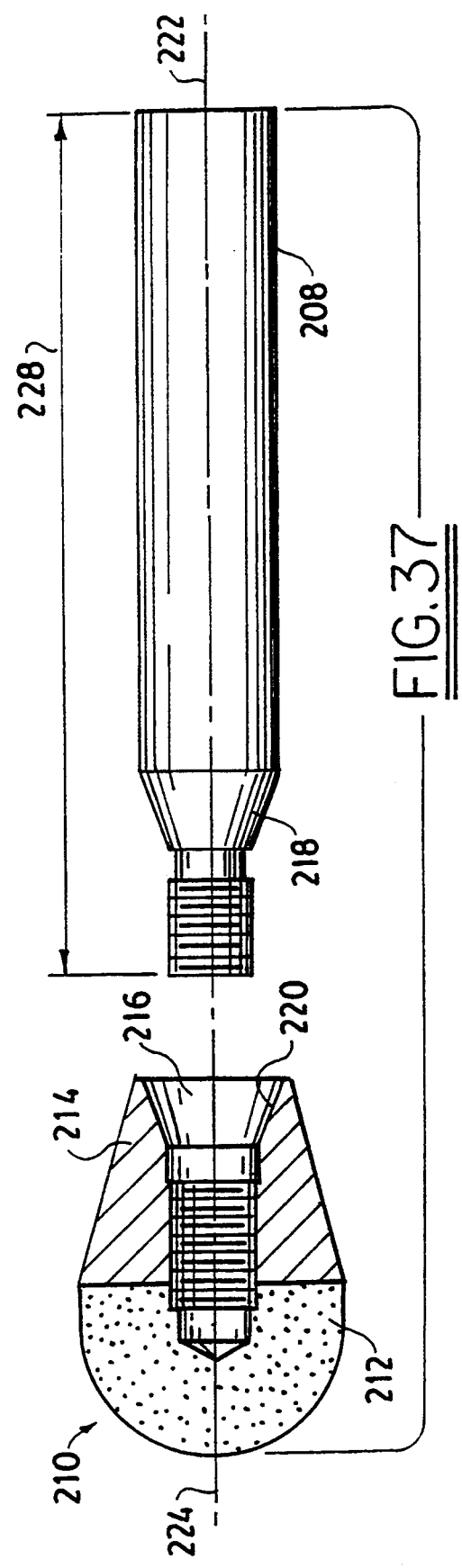

SYSTEM FOR GRINDING A WORKPIECE

CROSS-REFERENCE TO RELATED PATENT APPLICATION

This application is a continuation-in-part of patent application U.S. Ser. No. 07/658,178, filed Feb 20, 1991, now U.S. Pat. No. 5,197,228 which was a continuation-in-part of patent application U.S. Ser. No. 07/367,890, filed Jun. 19, 1989, and now abandoned.

FIELD OF THE INVENTION

Our invention relates to a system for regrinding the components of a constant velocity universal joint workpiece.

BACKGROUND OF THE INVENTION

Constant velocity universal joints are used in the wheel drive axles of front wheel drive automobiles and four-wheel drive automobiles; these joints are well known to those skilled in the art and are described, e.g., in U.S. Pat. Nos. 4,177,654, 4,300,651, 4,476,950, and 4,634,402, the disclosure of each of which is hereby incorporated by reference into this specification.

The constant velocity universal joint often are damaged during use. However, because of the relatively high cost of the precision machined components in such joints, the complete replacement of the joint is very expensive.

U.S. Pat. No. 4,593,444 of Kavthekar disclosed a machine for manufacturing constant velocity universal joints. The Kavthekar machine requires the use of a plurality of machining stations (and, thus, a plurality of tools). Furthermore, because the Kavthekar machine is designed for the original manufacturing of such joints, it relies upon the keyway of the original blank for positioning a workpiece in the machine. Furthermore, the Kavthekar machine does not contain means to move its grinding spindle in a vertical direction, or means to stop and lock its swing arm in a precise angular position relative to the axis of the grinding spindle; thus, this machine cannot be used to effectively regrind a Cross Groove style or a Plunge style constant velocity joint, and it cannot be used to grind the ball openings of the hardened cage. Furthermore, the Kavthekar machine does not contain means for calibrating the position of any given tool in relationship to the center of rotation in order to insure that precise dimensions are being machined.

It is an object of this invention to provide a system for regrinding a variety of worn constant velocity joints to within manufacturers' original tolerances or better, wherein the original bearing balls are replaced by oversized bearing balls of a common size for a particular type and size constant velocity joint.

It is another object of this invention to provide a system for regrinding the individual components of constant velocity universal joints which ensures precision grinding by the cooperative movement of a workpiece table and a compound grinder table through a predetermined and controlled pattern of positions without interruption of the process for the purpose of monitoring the dimensions of the component being ground.

It is yet another object of this invention to provide a system which regrinds worn or damaged constant velocity universal joints to consistent, precise, and improved tolerances between the bearing balls and the inner and outer races.

It is yet another object of the invention to provide a grinding machine with a novel arrangement of a workpiece holder and a tool holder which is capable of rotating various types and sizes of constant velocity universal joints through predetermined patterns of movements to accomplish precision grinding of various individual components.

It is yet another object of this invention to provide a machine which automatically performs the operations necessary to accomplish precision regrinding of the individual components of various types and sizes of constant velocity universal joints.

It is yet another object of this invention to provide a comprehensive database and catalog for the purpose of identifying constant velocity universal joints, combined with the appropriate information and dimensional locations for automatic positioning of all axes of motion required for the regrinding process.

It is yet another object of this invention to provide a system for grinding one or more of the components of constant velocity universal joints which is comprised of means for aligning the outer housing and/or the inner race component of a constant velocity joint within a workpiece holder attached to said machine.

It is yet another object of this invention to provide a machine for grinding one or more components of constant velocity universal joints which is comprised of a novel tool bit.

It is yet another object of this invention to provide a novel cooling system for cooling the tool bit and workpiece used in the grinding machine.

It is yet another object of this invention to provide a system for grinding constant velocity universal joints which is comprised of an alignment means for aligning the centerline of the workpiece holder of such machine with the centerline of the grinding spindle of such machine.

It is yet another object of this invention to provide a process for grinding one or more of the components of constant velocity universal joints in which various motions of the grinding machine are controlled by a computer program.

SUMMARY OF THE INVENTION

In accordance with this invention, there is provided a machine for regrinding grooves of a constant velocity universal joint workpiece which is comprised of a regrinding machine and a horizontal alignment adaptor. The regrinding machine preferably contains a chuck mechanism for holding the various workpieces of the constant velocity universal joint, an adaptor for mounting the workpiece in the chuck mechanism, a rotatable arm for supporting the chuck mechanism, means for controlling the motion of the rotatable arm in accordance with a computer program, a high-speed, motorized grinding spindle with a two-piece grinding bit comprised of an arbor and a grinding tip, means for injecting nonaqueous lubricant onto the grinding bit at a flow rate of at least 8 gallons per minute and a pressure of at least 40 pounds per square inch, means for reclaiming spent nonaqueous coolant, means for calibrating the position of the tip of the grinding bit, and a protective enclosure.

BRIEF DESCRIPTION OF DRAWINGS

The details of our invention will be described in connection with the accompanying drawings, in which:

FIG. 36 is a sectional view of the components of a preferred grinding bit used in the process of the invention;

FIG. 37 is a sectional view of the assembled grinding bit of FIG. 36.

DESCRIPTION OF THE PREFERRED EMBODIMENTS

Figure 1:
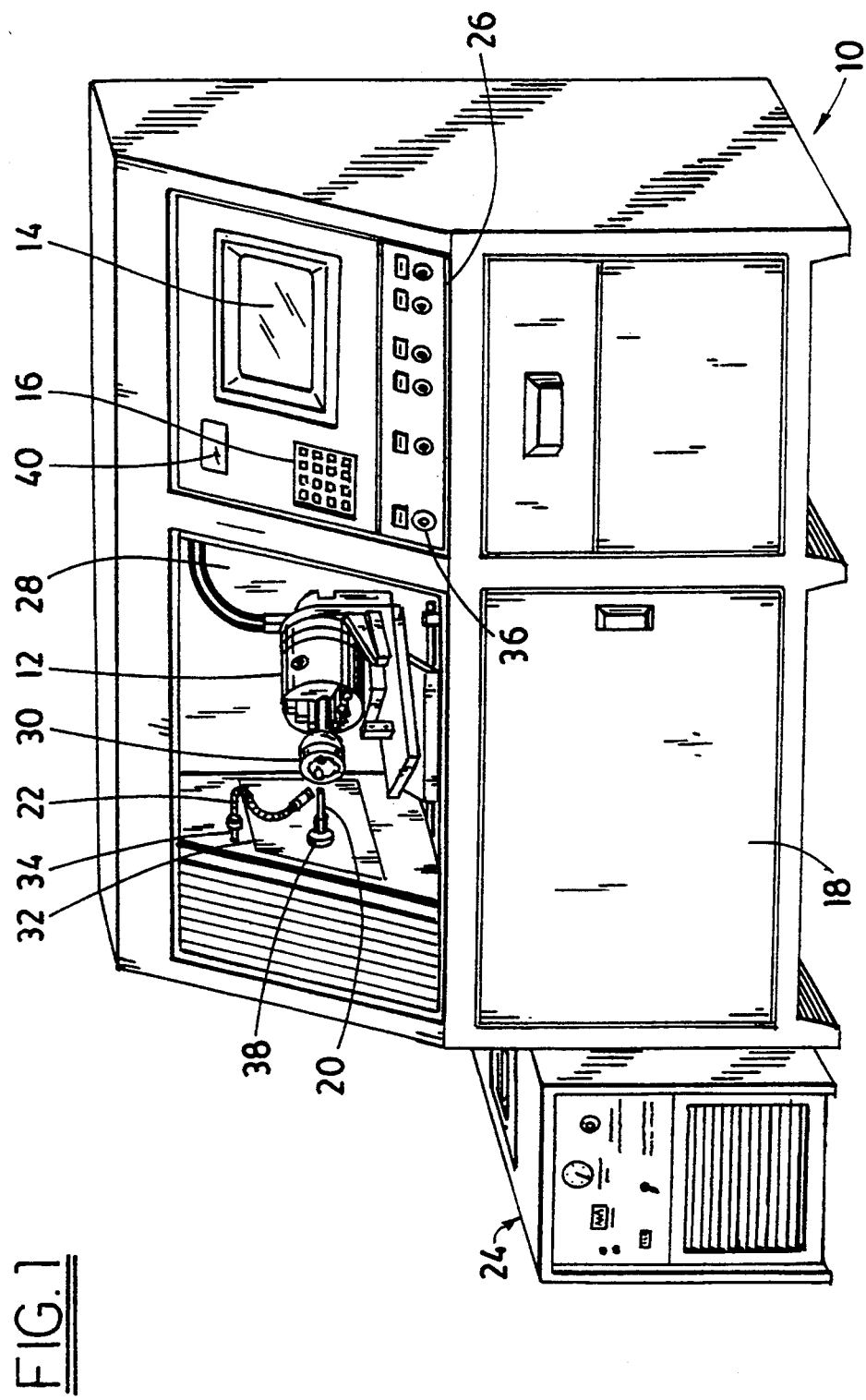
FIG. 1 is a perspective view of one preferred embodiment of the grinding machine assembly of this invention.

FIG. 1 is a representational perspective view of one preferred embodiment of grinding machine 10. Grinding machine 10 preferably comprises workpiece holder 12, computer monitor 14, keypad 16, cabinet 18, tool bit 20, coolant delivery nozzle 22, spindle cooling means 24, and control panel 26.

Referring to FIG. 1 it will be seen that, within cabinet 18, workpiece holder 12 is preferably partially enclosed by front protective enclosure 28, which prevents the lubricating and cooling medium from escaping to the outside environment as it is sprayed onto the workpiece 30 and the workpiece holder 12. In one preferred embodiment, protective enclosure 28 is a sheet of transparent material which, in one preferred aspect, consists essentially of glass, such as, e.g., tempered safety glass.

In one preferred embodiment, illustrated in FIG. 1, a flexible shield 30 is disposed between the tool bit 20 and means for causing said tool bit 20 to rotate (not shown). This flexible shield 30 not only facilitates sealing but also deforms in order to admit to displacements of tool bit 20 in the Y and Z planes prior to regrinding workpiece 30.

Flexible shield 30 is preferably an elastomeric material which possesses a substantial amount of chemical and thermal resistance to degradation. In one preferred embodiment, flexible shield 30 consists essentially of soft neoprene rubber with a Shore A durometer rating of from about 5 to 10.

Again referring to FIG. 1, it will be seen that grinding machine 10 is preferably comprised of a coolant delivery nozzle arrangement 22 which cools the workpiece 30 and the tool bit 20 and removes grinding swarf created during the grinding process. Cooling medium (not shown) is conveyed to nozzle 22 by means of coolant delivery pipe 34 and a pump (not shown in FIG. 1); and the coolant is removed via a drain hole and a drain pipe (not shown in FIG. 1). These residues are then carried into a recycling reservoir (not shown) where the coolant medium is cleaned and decontaminated.

Also illustrated in FIG. 1 is monitor 14, which, in response to requests from the grinding machine operator and/or the computer program which is operatively connected to grinding machine 10, can display information regarding the particular component part, or workpiece, which is to be reground. In the preferred embodiment illustrated in FIG. 1, the grinding machine operator may input information through keypad 16. In this embodiment, a microprocessor (not shown) disposed within cabinet 18 retrieves data regarding the specifications for the particular constant velocity universal joint component part being reground from a database (not shown) within cabinet 18. The information is processed by the microprocessor, resulting in the initiation of the appropriate grinding sequence and precise axes positioning.

Referring again to FIG. 1, and in the preferred embodiment illustrated therein, it will be seen that an emergency stop button 36, when depressed, will immediately remove the electricity and the air pressure from all of the components of the grinding machine assembly 10. Emergency stop button 36 is preferably incorporated into cabinet 18, within the panel of switch gear 26 which provides electricity for the electronic components which serve to supply energy to the electrically operated parts of the grinding machine and the assorted hydraulic and/or pneumatic components.

Referring again to FIG. 1, it will be seen that spindle cooling means 24 is adapted to cool refrigerant (not shown) by a suitable cooling device (not shown) so that cooled refrigerant can be used to cool spindle 38. The use of cooling means 24 helps to insure that the bearings (not shown) associated with spindle 38 are preferably maintained at a relatively constant temperature of about 24 degrees Celsius in order to avoid early bearing failure.

In the preferred embodiment illustrated in FIG. 1, the speed of spindle 38 is preferably shown in display 40. In one preferred embodiment, display 40 is a conventional liquid crystal display. It is preferred that, in the operation of applicants' grinding machine, spindle 38 rotate at a speed of at least about 30,000 revolutions per minute and, more preferably, from about 30,000 to about 50,000 revolutions per minute.

Figure 2:
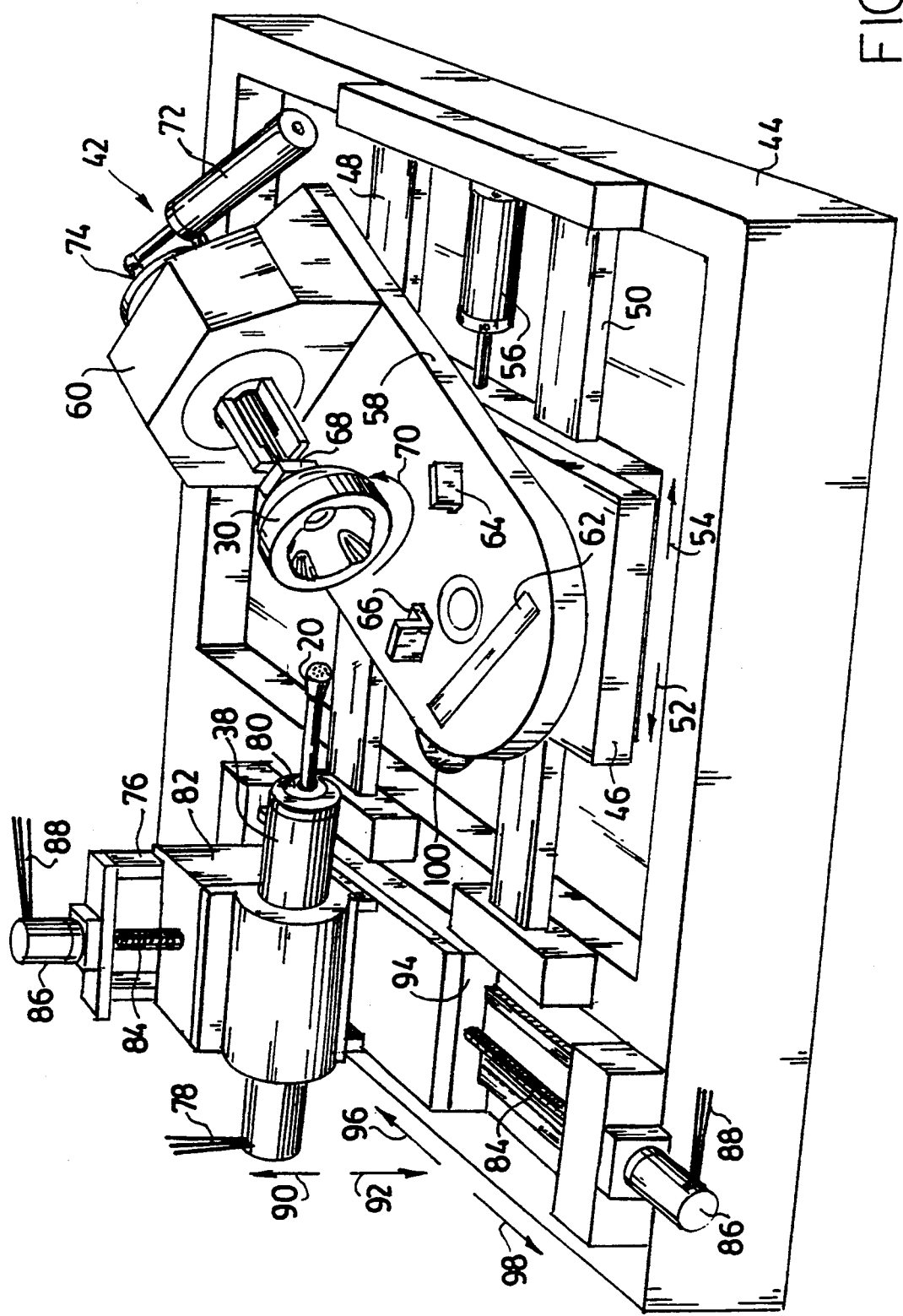
FIG. 2 is another perspective view of one portion of the assembly of FIG. 1.

FIG. 2 is a perspective view of a preferred embodiment of grinding machine 10, which is comprised of a grinding station 42 situated upon a base 44. The grinding station 42 includes workpiece table 46 which is movably mounted upon a first set of support rails 48 and 50.

In the embodiment illustrated in FIG. 2, workpiece table 46 is moved in the directions of arrows 52 and 54 by conventional motive means such as, e.g., cylinder 56. Cylinder 56 may, e.g., be a hydraulic cylinder.

Any of the support rails configurations known to those skilled in the art may be used for support rails 48 and 50. Thus, by way of illustration, although support rails 48 and 50 are illustrated in FIG. 2 as having rectangular cross-sections, these support rails may have circular cross-sections.

Referring again to FIG. 2, it will be seen that the workpiece table 46 is preferably comprised of rotatable arm 58, upon which is mounted indexer and chuck mechanism 60, alignment plate 62, and touch off blocks 64 and 66.

Chuck and indexing mechanism 60 is one preferred means for receiving the workpiece 30 and, with the aid of adaptor/spacer 68, accommodating the workpiece 30. In one preferred embodiment, the workpiece 30 may be any one of the various components of a constant velocity universal joint.

Referring again to FIG. 2, it will be seen that chuck and indexing mechanism 60 both holds workpiece 30 and is adapted to periodically and systematically rotate workpiece 30 counterclockwise in the direction of arrow 70 so that tool bit 20 may sequentially contact different tracks of workpiece 30 until each of the six different tracks of said workpiece have been ground to specifications.

Any conventional means may be used to hold and rotate workpiece 30. In the embodiment illustrated in FIG. 2, pneumatic cylinder 72 is rotatably connected via an indexing linkage 74 to workpiece 30.

Referring again to FIG. 2, it will be apparent to those skilled in the art that, for purposes of better illustration, shield 32 is not shown for purposes of clarity in order to better illustrate spindle 38 and compound grinding table 76.

The compound grinding table 76 supports grinder spindle 38. Grinder spindle 38 is preferably connected to a source of power such as, for example, a variable frequency alternating current converter (not shown). In the embodiment illustrated in FIG. 2, the variable frequency alternating current produced by this power source is fed via power line 78.

In one preferred embodiment, spindle 38 is an SC 80-0 spindle which may be obtained, e.g., from the Precise Corporation of 3715 Blue River Avenue, Racine, Wisconsin. This preferred spindle is a variable speed high frequency motorized spindle designed for high speed machining applications. Its integral induction motor requires a variable frequency drive system. Both motor and bearing system are cooled by a circulating water system. In this embodiment the motor and spindle are an integral assembly.

It is preferred that spindle 38 be adapted to rotate grinding bit 20 at a speed of at least 35,000 revolutions per minute and, preferably, from about 40,000 to about 50,000 revolutions per minute. As will be apparent to those skilled in the art, the actual speed attainable with any particular grinding bit 20 will be a function of, e.g., the extended length 226 of grinding bit 20 (see FIG. 36). In general, it is preferred that length 226 be from about 1.0 to about 3.5 inches, from the face of spindle collet 80.

Collet 80 is adapted to hold the grinding bit 20 throughout the grinding process, and, because collet 80 is adjustable, the extent to which grinding bit 20 extends from the face of collet 80 may be varied.

Referring again to FIG. 2, it will be seen that spindle 38 is attached to Z-axis saddle plate 82 which, in turn, is movably mounted on compound grinding table assembly 76. Z axis saddle plate 82 is movably connected to compound grinding table assembly 76 by means of a ball screw 84 and, by means of motor 86 (which is connected to a source of power, not shown, by lines 88), may be moved in the directions of arrows 90 and 92. Such movement in the "A axis" facilitates the vertical positioning of spindle 38 with regard to workpiece 30.

It will be apparent to those skilled in the art that, because applicants' machine contains means for moving the spindle up and down in the "Z axis," such machine is capable of regrinding not only Rzeppa-type joints but also other types of joints, such as cross-groove style or plunge type constant velocity joints. By comparison, the device of U.S. Pat. No. 4,593,444 does not contain means for moving its spindle up and down and, thus, can only be used for Rzeppa-type of joints.

The entire means for moving the spindle in the Z axis, described, above, is mounted upon Y-axis saddle plate 94, which, in turn, is movably mounted on compound grinding table assembly 76. Y axis saddle plate 94 is movably connected to compound grinding table assembly 76 by means of a ball screw 84 and, by means of motor 86 (which is connected to a source of power, not shown, by lines 88), and it may be moved in the directions of arrows 96 and 98. Such movement in the "Y axis" facilitates the horizontal positioning of spindle 38 with regard to workpiece 30.

In one embodiment of the invention, the compound grinding table 76 is equipped for controlled simultaneous movement along both the Y axis and the Z-axis.

As is indicated elsewhere in this specification, coolant is sprayed upon workpiece 30 by means not shown in FIG. 2. In the preferred embodiment illustrated in FIG. 2, coolant is drained from grinding machine 10 through drain hole 100, through a drain pipe (not shown), back to a coolant reservoir (not shown in FIG. 2).

In the preferred embodiment illustrated in FIG. 2, alignment plate 62 provides a horizontal reference surface which may be used to align the tracks of workpiece 30 horizontally within the workpiece holder 12. A horizontal alignment adaptor (not shown in FIG. 2, but see FIG. 21), which is discussed elsewhere in this specification, is used in conjunction with alignment plate 62 to align the workpiece 30.

In one embodiment, the grinding bit 20 preferably is preferably comprised of a steel geometric blank plated with a coating which consists essentially of an inorganic abrasive material. In one preferred embodiment, the coating material consists essentially of a boron nitride material which, preferably, is cubic boron nitride. This material may be obtained from many different vendors; see, for example, page 137 of the 1991-1992 edition of "Ceramic Source," Volume 7 (published by the American Ceramic Society, Westerville, Ohio). Thus, by way of illustration, it may be purchased from the General Electric Corporation's Superabrasives Division, of Worthington, Ohio under the tradename of "BORAZON" (which is cubic boron nitride).

Means for preparing grinding devices which are comprised of a thin coating of cubic boron nitride are well known to those skilled in the art and are described n, e.g., U.S. Pat. Nos. 4,971,602, 4,923,490, 4,854,087, and 4,466,656, the disclosures of each of which is hereby incorporated by reference into this specification.

In one embodiment, it is preferred that the coating on grinding bit 20 be deposited as a single grain depth layer and bonded to the surface of the geometrical steel blank by a nickel matrix.

In the use of the preferred grinding bit 20, it is essential that the medium used to cool the grinding bit be non-aqueous; water, or water-soluble materials must not be used. In one preferred embodiment, the cooling medium is a cutting oil such as, e.g., MX-237 cutting oil (which is available from the MX Oil Company of Texas), "RE-LI-ON" cutting fluid (which is manufactured by the Re-Li-On corporation of 3307 North Holland-Sylvania Road, Toledo, Ohio), and the like. Other nonaqueous cooling systems will be apparent to those skilled in the art.

The preferred non-aqueous lubricant used in applicants' process preferably will be injected at the surfaces of the workpiece at a flow rate of at least 8 gallons per minute and a pressure of at least 40 pounds per square inch.

Applicants have discovered that their preferred grinding bit 20 is very durable under the conditions of their process and, to the extent that it does wear, wears evenly. When the grinding bit has to be refurbished, it can be replated with the preferred cubic boron nitride material rather than being replaced.

In one preferred embodiment, the grinding machine 10 is comprised of a means to compensate for the wear of the grinding bit due to successive regrindings. The computer program contains an adjustable tool offset subroutine which may be entered through keypad 16.

In one embodiment, because the length of the grinding bit 20 affects the depth of regrinding, the position of the grinding bit 20 may be adjusted relative to the workpiece 30 in order to compensate for a change in the length of the grinding bit. Before the regrinding operation begins, the appropriate grinding bit 20 is inserted loosely into the variable collet 80 and the workpiece table 46 is positioned in relationship to the grinding bit 20, with the reference surfaces of the touch off blocks 64 and 66 both oriented towards the grinding bit 20. The grinding bit 20 is then pulled out of the variable collet 80 until it is solidly against said reference surface of the touch off blocks 64 and 66. Then the variable collet 80 holding the grinding bit is tightened.

Empirical tests have shown that, with the grinding bit 20 sized properly, very precise control of the regrinding operation is obtained to a tolerance of plus or minus 0.0015 inches.

Figure 3:
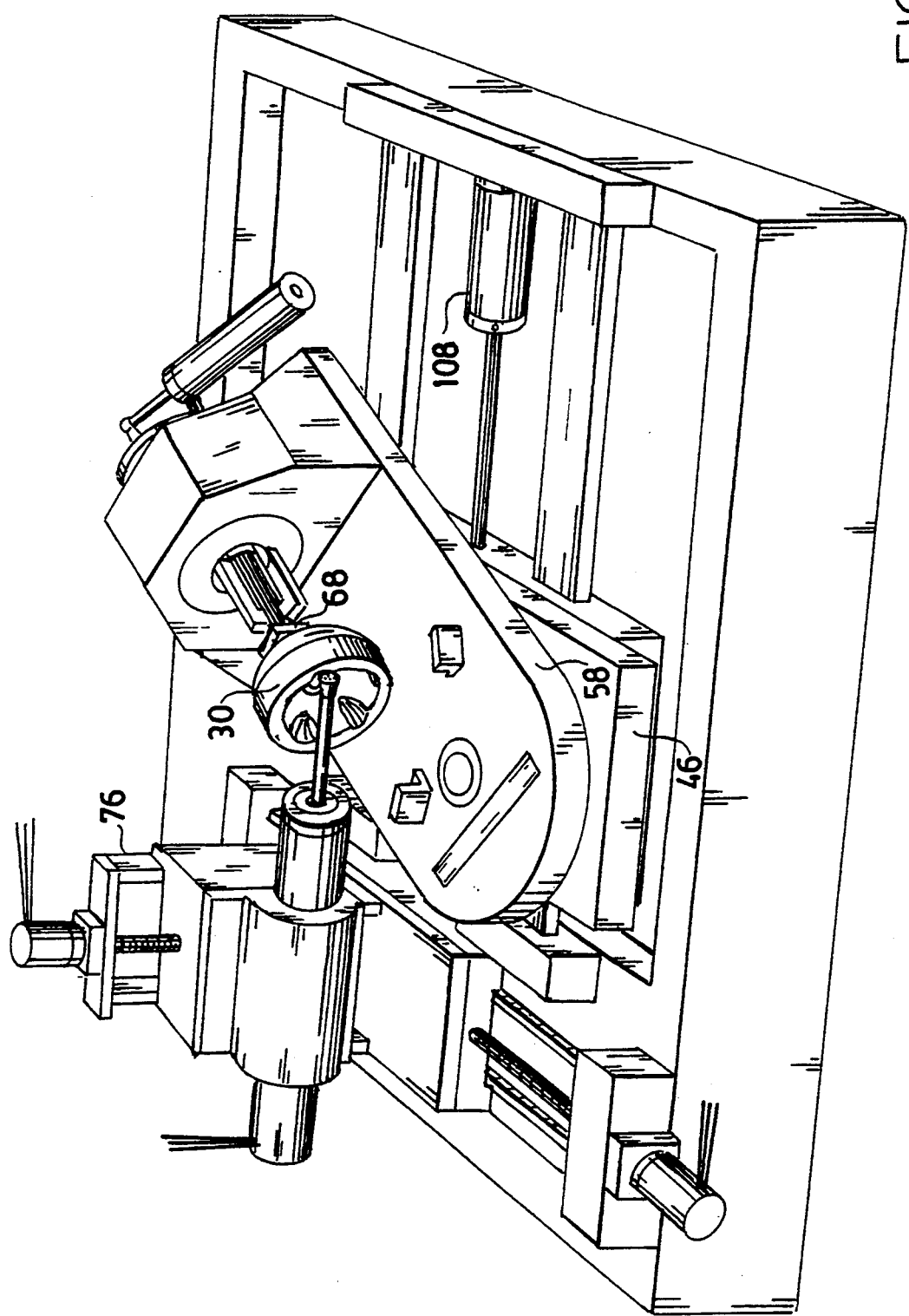
FIG. 3 is another perspective view of the assembly of FIG. 1, illustrating a workpiece and grinding bit in positions different than depicted in FIG. 2.

FIG. 3 is a perspective view of grinding machine 10 illustrating the components of workpiece table 46 and compound grinding table 76 as they are engaged in the grinding of workpiece 30.

Figure 27:
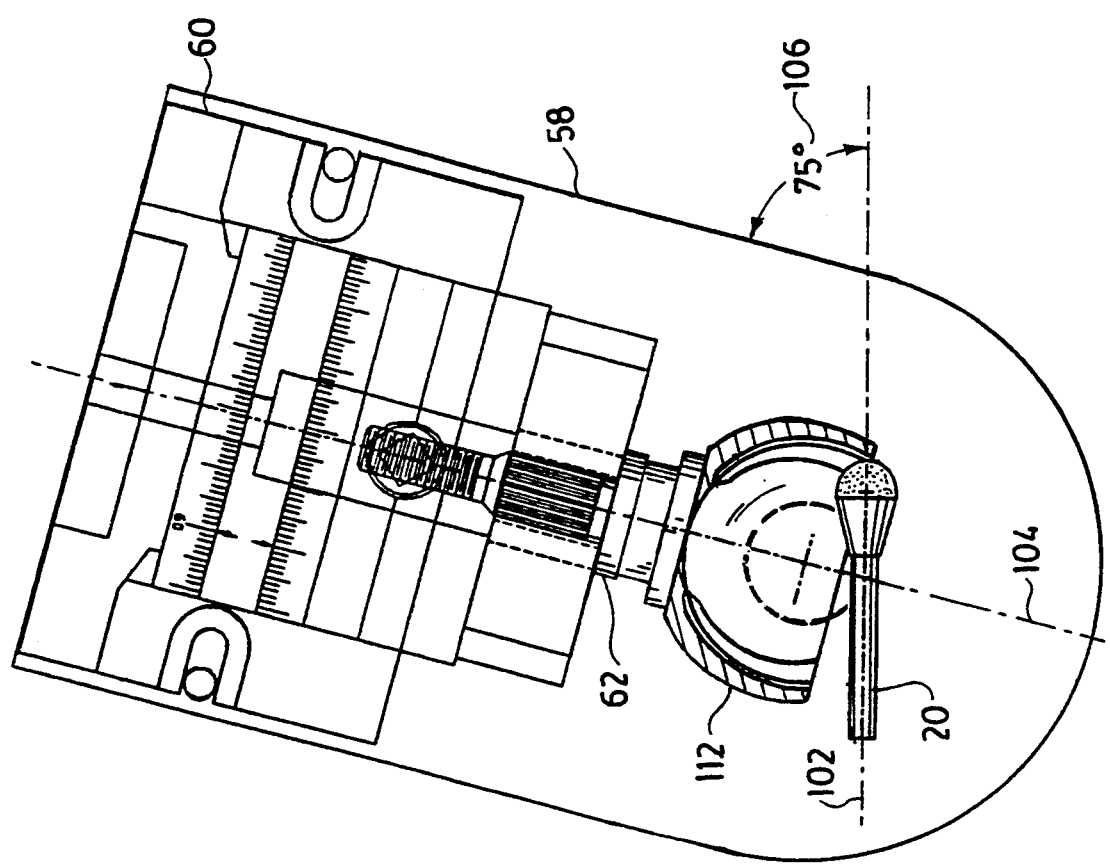
FIG. 27 is a partial sectional view of the machine of FIG. 1 illustrating the relative positions of the grinding table, the workpiece holder, the outer race spacer, and the outer housing component at the seventy-five degree position relative to the axis of the grinding tool.
Figure 28:
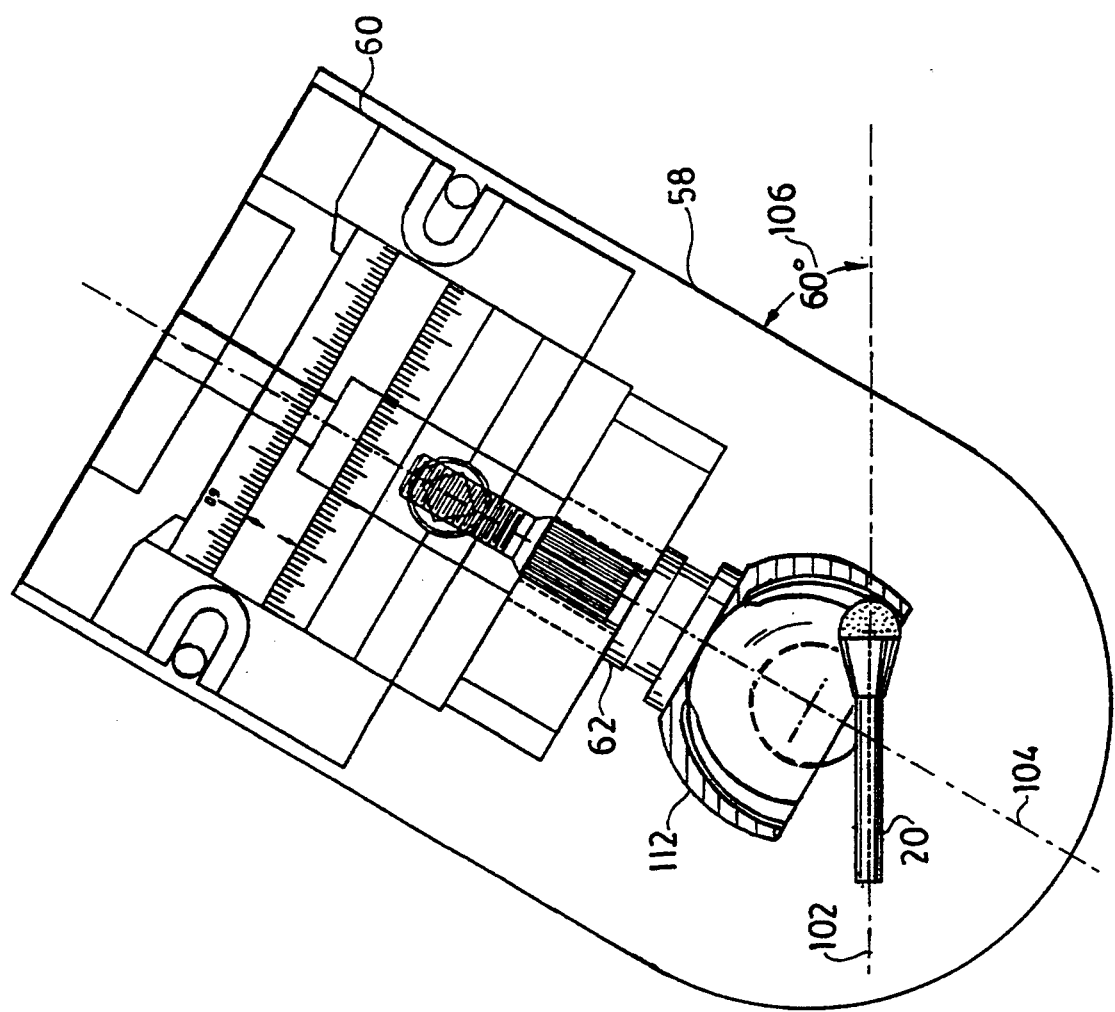
FIG. 28 is a partial sectional view of the machine of FIG. 1 illustrating the relative positions of the grinding table, the workpiece holder, the outer race spacer, and the outer housing component at the sixty degree position relative to the axis of the grinding tool.
Figure 29:
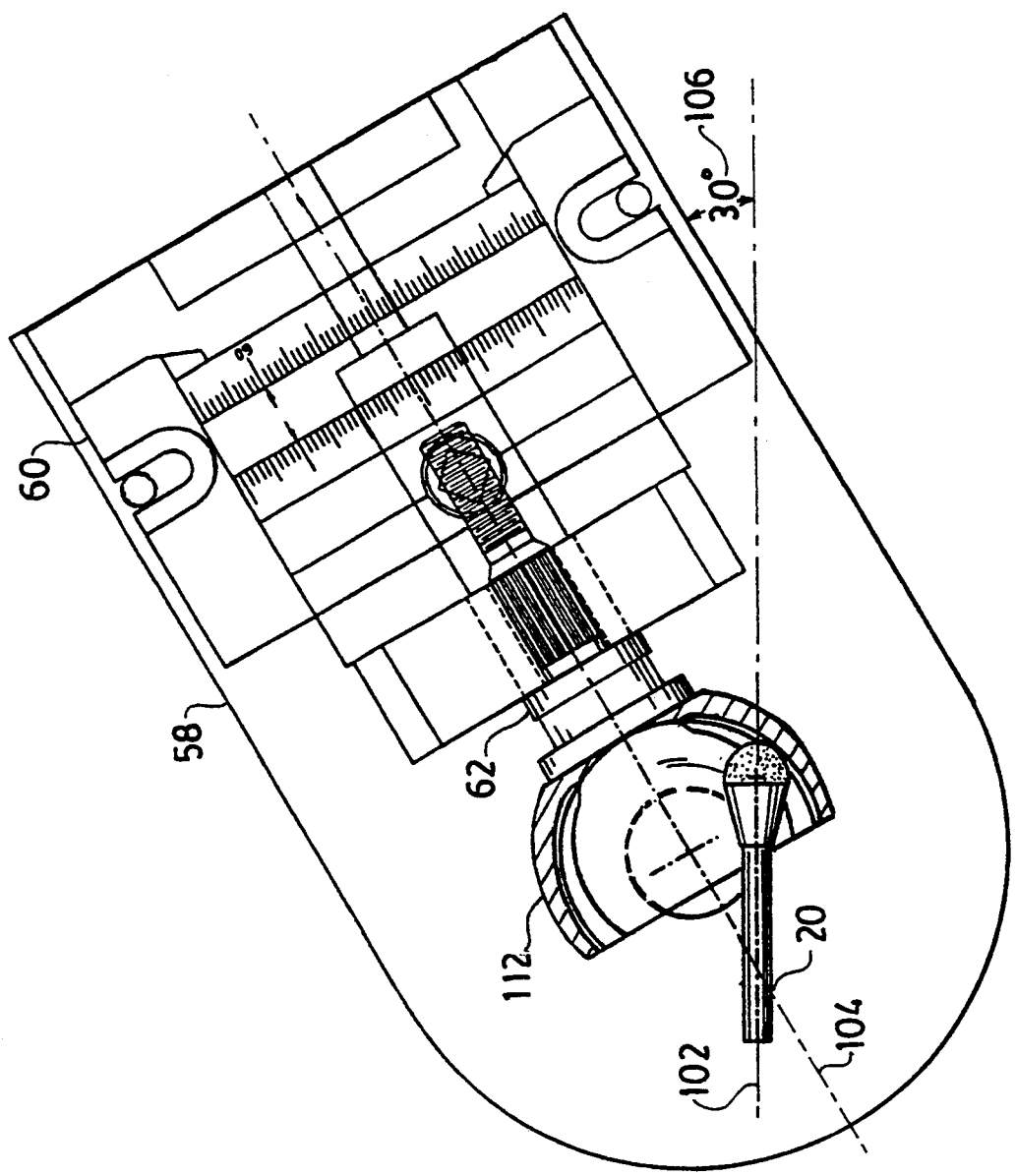
FIG. 29 is a partial sectional view of the machine of FIG. 1 illustrating the relative positions of the grinding table, the workpiece holder, the outer race spacer, and the outer housing component at the thirty-degree position relative to the axis of the grinding tool.
Figure 30:
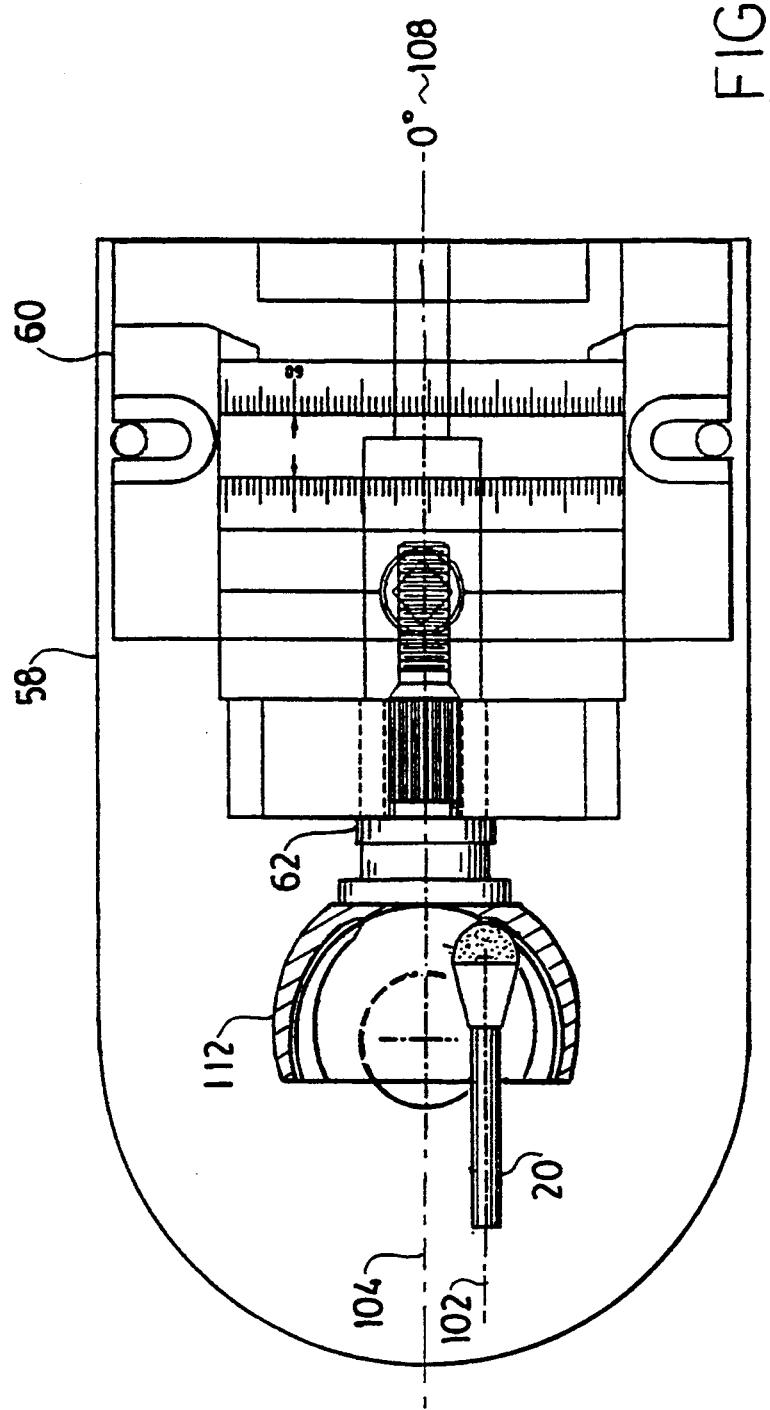
FIG. 30 is a partial sectional view of the machine of FIG. 1 illustrating the relative positions of the grinding table, the workpiece holder, the outer race spacer, and the outer housing component at the zero degree position relative to the axis of the grinding tool.
Figure 31:
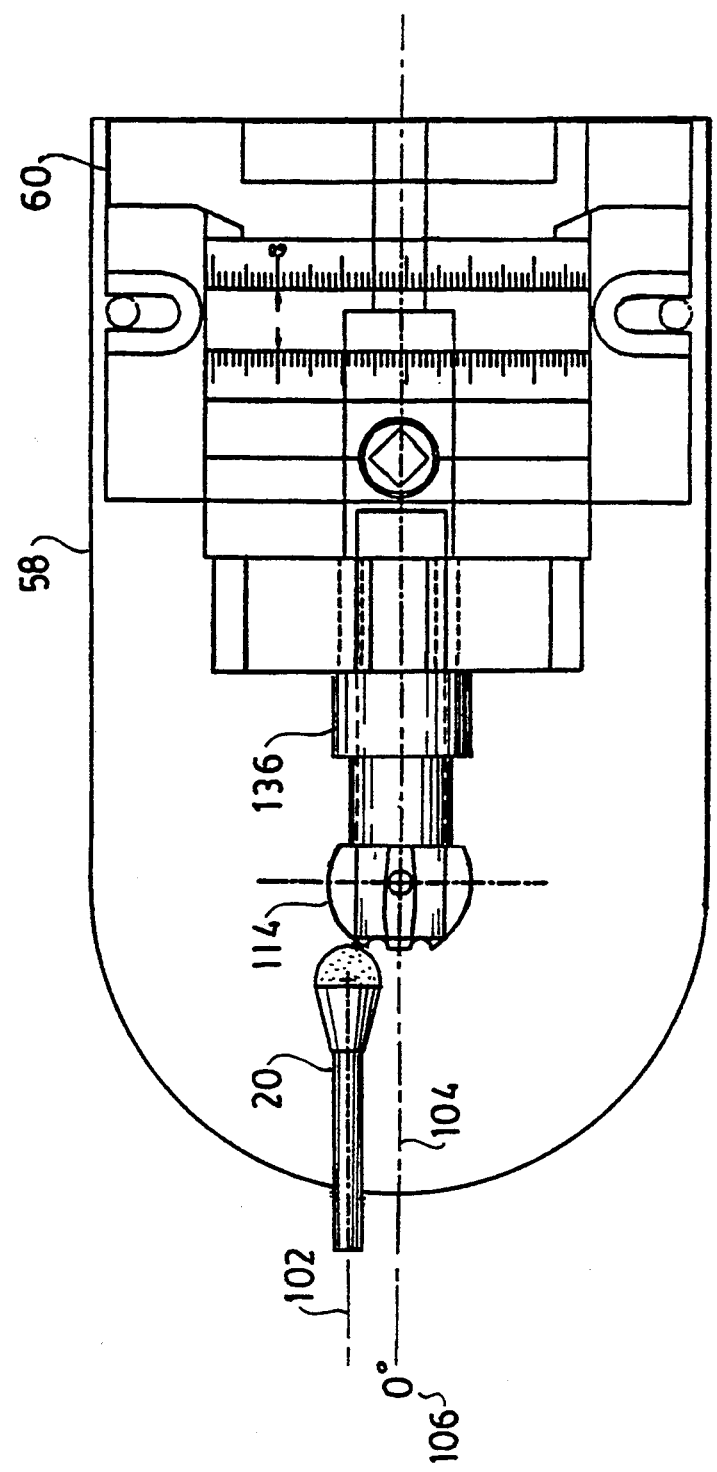
FIG. 31 is a partial sectional view of the machine of FIG. 1 illustrating the relative positions of the grinding table, the workpiece holder, the inner race spacer, and the inner race component at the zero degree position relative to the axis of the grinding tool.
Figure 32:
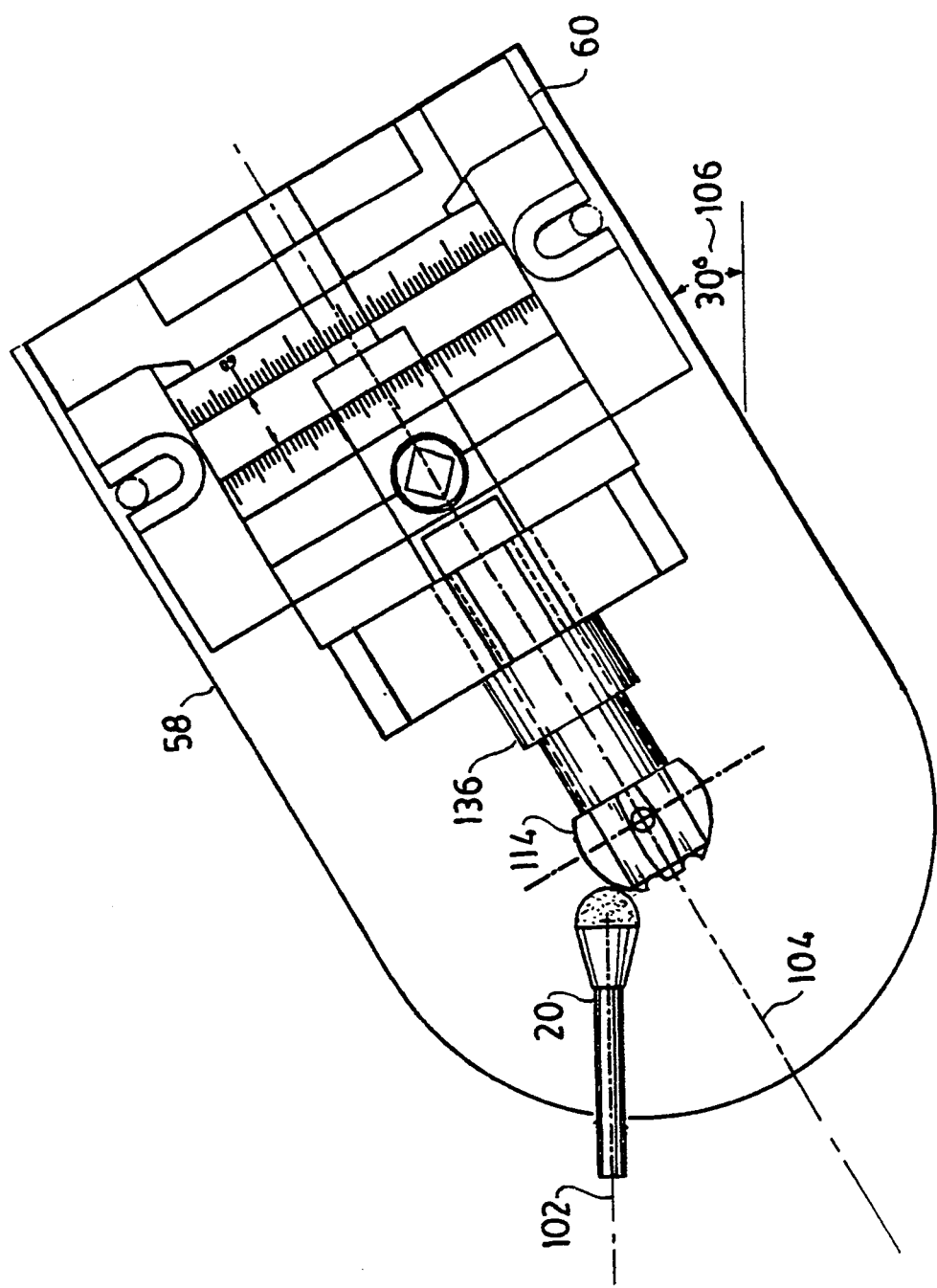
FIG. 32 is a partial sectional view of the machine of FIG. 1 illustrating the relative positions of the grinding table, the workpiece holder, the inner race spacer, and the inner race component at the thirty degree position relative to the axis of the grinding tool.
Figure 33:
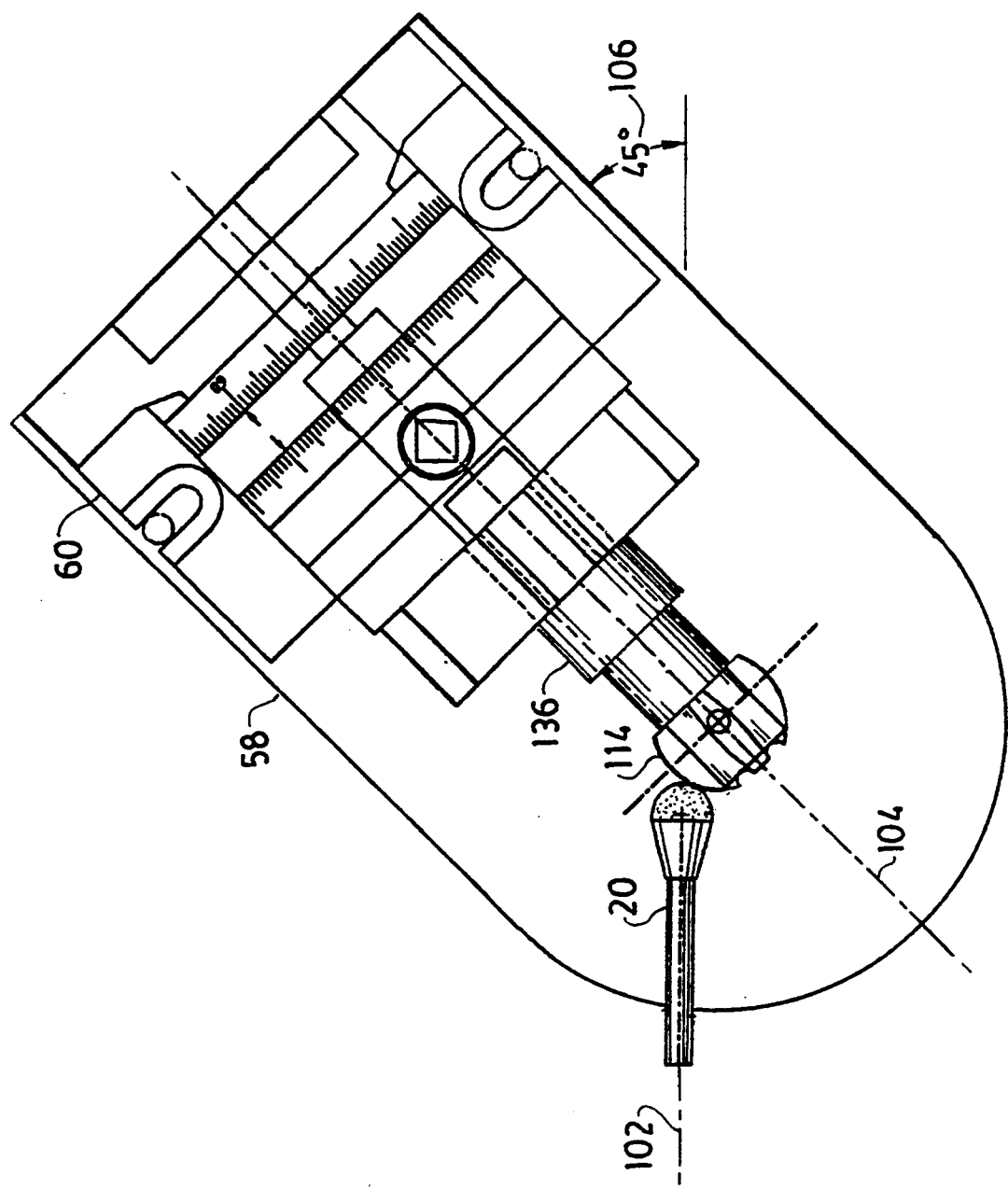
FIG. 33 is a partial sectional view of the machine of FIG. 1 illustrating the relative positions of the grinding table, the workpiece holder, the inner race spacer, and the inner race component at the forty-five degree position relative to the axis of the grinding tool.
Figure 34:
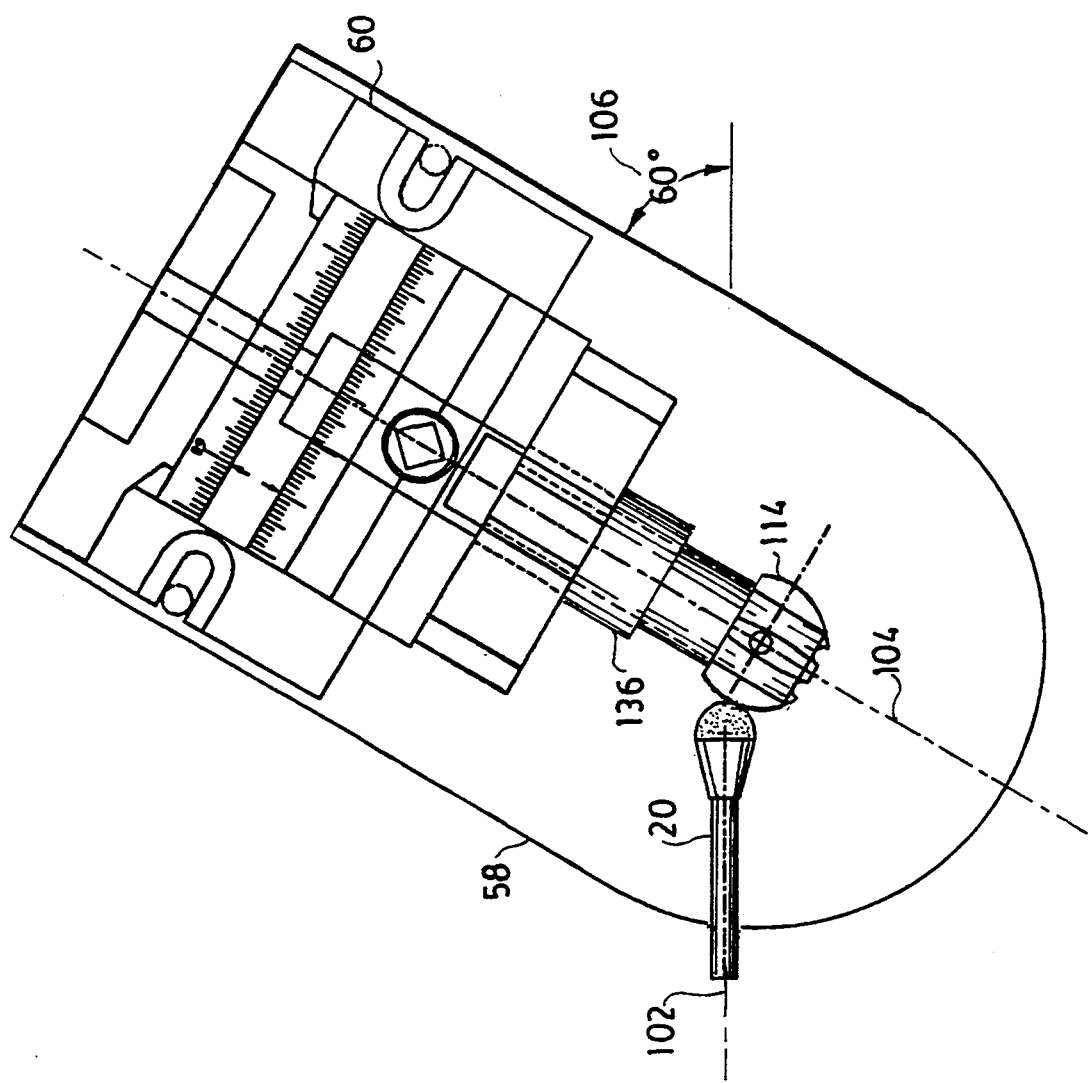
FIG. 34 is a partial sectional view of the machine of FIG. 1 illustrating the relative positions of the grinding table, the workpiece holder, the inner race spacer, and the inner race component at the sixty degree position relative to the axis of the grinding tool.
Figure 35:
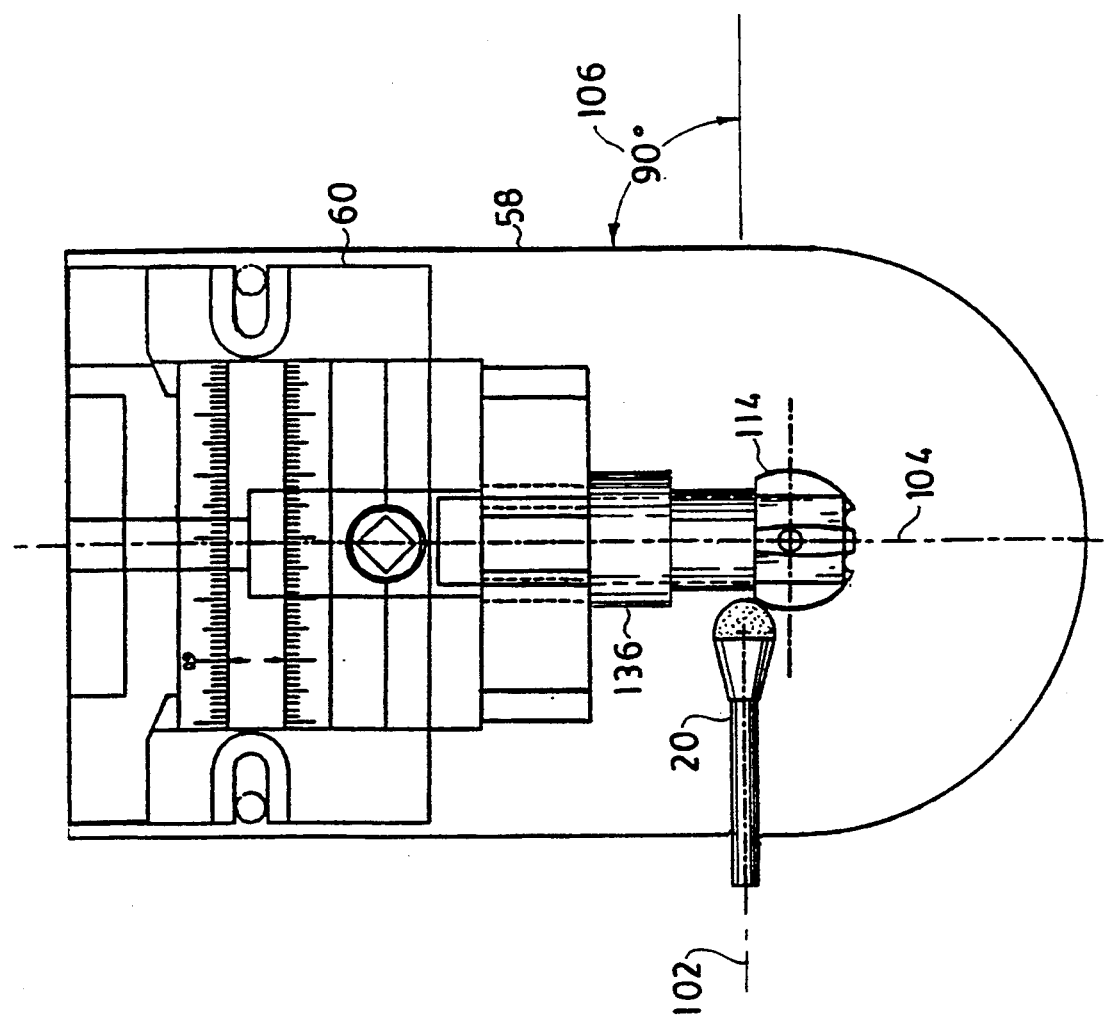
FIG. 35 is a partial sectional view of the machine of FIG. 1 illustrating the relative positions of the grinding table, the workpiece holder, the inner race spacer, and the inner race component at the ninety degree position relative to the axis of the grinding tool.

Grinding machine 10 is comprised of means for varying the angle formed by the intersection of axial centerline of grinding bit 20 with the axial centerline of the workpiece 30. Referring to FIG. 27, and in the embodiment illustrated therein, it will be seen that grinding bit 30 has a centerline 102. It will also be seen that workpiece 20 also has a centerline 104. At the intersection of axial centerlines 102 and 104, an angle of rotation 106 is formed. This angle of rotation 106 is varied from 0 to 90 degrees during the grinding sequence by rotating rotatable arm 58 by means of a cylinder (not shown in FIG. 27).

Referring again to FIG. 3, it will be seen that hydraulic cylinder 108 is operatively connected to a linkage (not shown) attached to the rotatable arm 58; in the embodiment illustrated in FIG. 3, cylinder 56 (see FIG. 2) has been removed for the purposes of illustration and clarity. By the same token, in FIG. 2, cylinder 108 has been removed for the purposes of illustrating cylinder 56 and clarity.

Thus, hydraulic cylinder 108 (which is controlled by a computer program) can vary both the degree of rotation of rotatable arm 58 and, consequently, the length of the cut made in the workpiece 20 in response to the computer program Thus, referring to both FIGS. 2 and 3, it will be apparent to those skilled in the art that applicants' novel grinding machine is comprised of means (1) for rotating grinding bit 20 at a speed of at least 35,000 r.p.m. by means, e.g., of spindle 38, (2) for moving spindle 38 up and down in the "Z axis" plane, (3) for moving spindle 38 in and out in the "Y" axis plane, (4) for moving the rotatable arm 58 left to right in the "X" axis plane, (5) for rotating rotatable arm 58 through up to 90 degrees of rotation so that the angle it forms with the centerline of the grinding bit 20 may be varied, and (6) means for rotating workpiece 30 axially about its centerline.

In one preferred embodiment, the grinding machine 10 is adapted to automatically regrind the components of a variety of constant velocity universal joints. The particular workpiece 30 to be reground is maintained on the workpiece table 46 by indexer and chuck mechanism 60 and adaptor/spacer 62 (see FIG. 2). As will be apparent to those skilled in the art, the embodiment of the adaptor/spacer to be used will depend upon the type of workpiece being reground.

Figure 4:
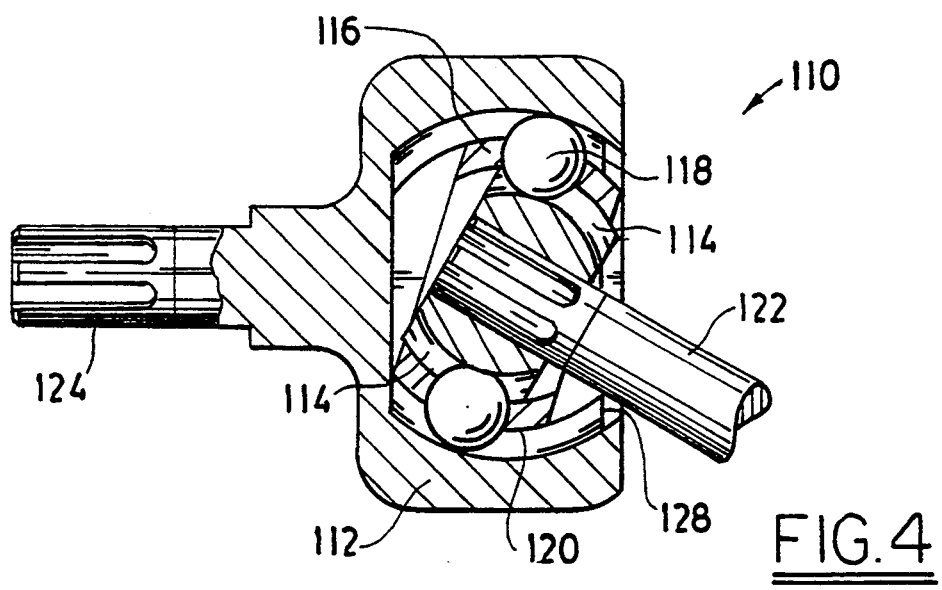
FIG. 4 is a sectional view of a ball type of constant velocity universal joint.

FIG. 4 is a cross-sectional view of a typical constant velocity universal joint 110, the components of which include outer race 112 (which is typically connected to the front wheel components by means of a splined trunion), transmission output by means of a splined receptacle), intermediate bearing retainer (cage) 116, and bearing ball 118. These components, in combination, constitute a sliding joint which accommodates vertical and horizontal misalignment between the vehicle transmission and the front wheel drive components and, thus, permits the turning of the front wheels for steering.

Referring again to FIG. 4, a typical constant velocity universal joint is assembled such that the bearing balls bearings fit closely within radial circular tracks 120 which are machined in the inner surface of the outer race 112 and in the outer surface of the inner race 114. This design permits the bearing balls to roll forward and backward in the radial circular tracks 120 as input shaft 122 is turned out of axial alignment with output shaft 124 but prevents the bearing balls from engaging in vertical to horizontal motion relative to the radial circular tracks' 120 central axis.

The intermediate bearing retainer (cage) 116 is machined with cage openings 126 (see FIG. 5) on its surface so that it can retain the bearing balls within the radial circular tracks 120 and between the outer race 112 and the inner race 114.

Referring again to FIG. 4, it will be seen that CV joint boot 128, which preferably is made of synthetic rubber or a similar material, is tightly affixed to the outer surface of the constant velocity universal joint 110 and the output shaft 124 in order to protect the assembly. As will be apparent to those skilled in the art, constant velocity universal joints are usually manufactured and installed with such CV joint boots 128.

It will be apparent to those skilled in the art that FIG. 4 is merely illustrative of the typical components of a constant velocity universal joint and that several different kinds of constant velocity universal joints exist. The grinding machine of this invention is easily adaptable to regrind the components of any one of a number of constant velocity universal joints, some of which are discussed below.

Figure 5:
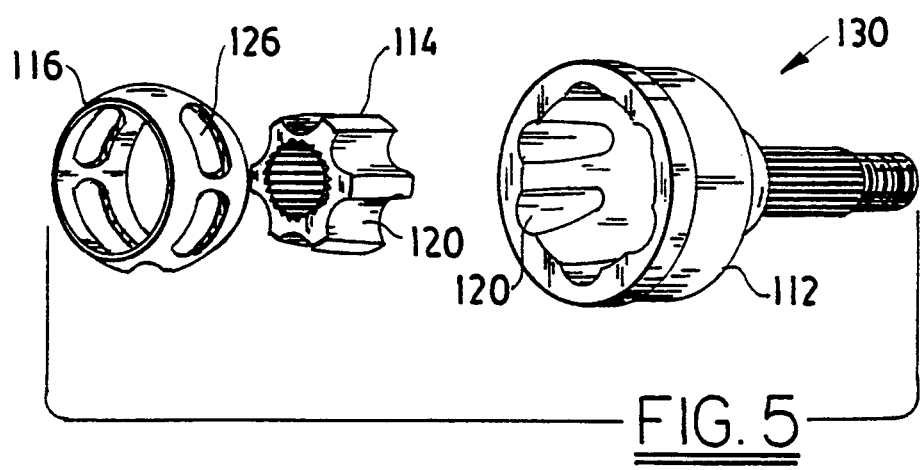
FIG. 5 is an exploded view of a Rzeppa constant velocity universal joint.

FIG. 5 illustrates a typical Rzeppa constant velocity universal joint 130. Like the typical constant velocity universal joint 110 discussed in FIG. 4, the components of this Rzeppa joint 130 include outer race 112, inner race 114, and intermediate bearing retainer (cage) 116. Radial circular tracks 120, discussed previously with reference to FIG. 4, are also illustrated in FIG. 5.

Figure 6:
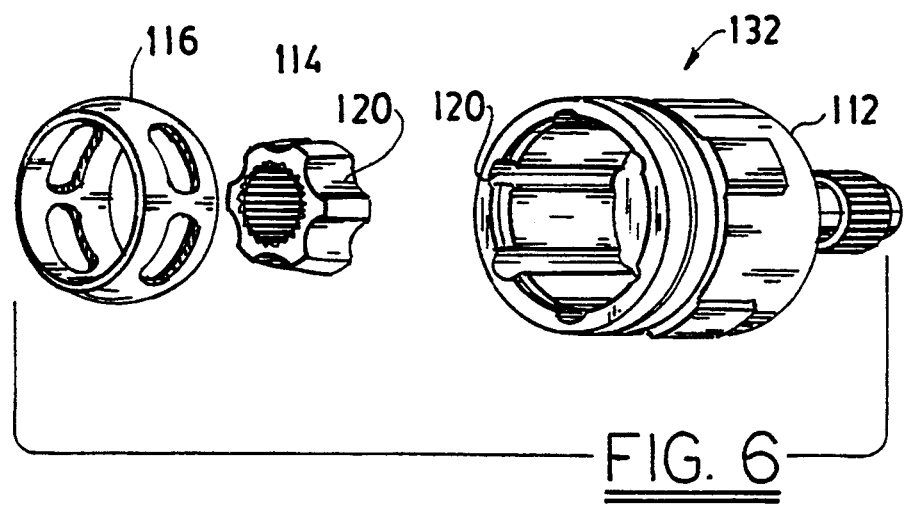
FIG. 6 is an exploded view of an In-Line constant velocity universal joint.

FIG. 6 illustrates an In-Line constant velocity universal joint 132 which includes outer race 112, an inner race 114, and intermediate bearing retainer (cage) 116. The joint is similar to the one illustrated in FIG. 4 except the tracks 120 of the outer race 112 and the inner race 114 do not have a radius of curvature.

Figure 7:
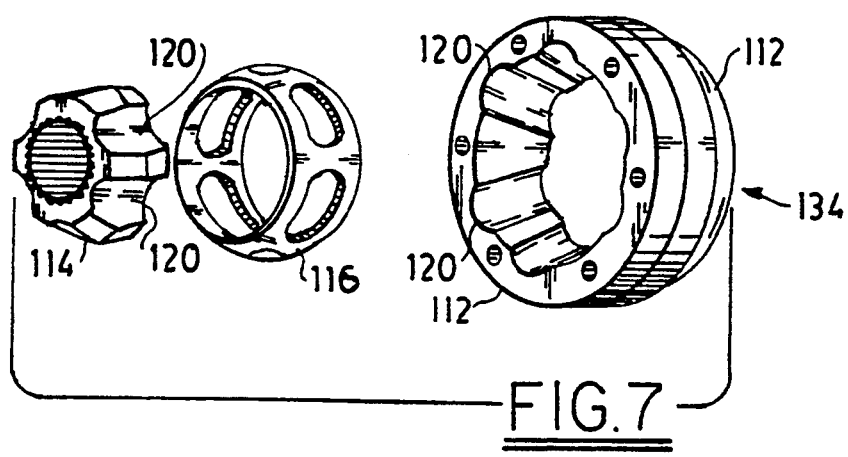
FIG. 7 is an exploded view of a Skewed Groove Disk constant velocity universal joint.

FIG. 7 illustrates Skewed Groove Disk constant velocity universal joint 134. In this type of constant velocity universal joint, outer race 112 contains grooves 120. However, unlike the grooves 120 of other universal joints, the three of the alternating grooves 120 are skewed clockwise; the other three alternating grooves 120 are skewed counterclockwise. The grooves 120 in this joint do not have a radius of curvature as do the grooves 120 in the outer race of the constant velocity joint of FIG. 4. Inner race 114 is similar to the inner race of the constant velocity joint of FIG. 4 except that grooves 120 of this former embodiment are angled either clockwise or counterclockwise. This type of constant velocity universal joint also includes intermediate bearing retainer (cage) 116.

It will be apparent to those skilled in the art that the grinding machine 10 of this invention, although adapted to regrind the components of the various constant velocity universal joints discussed above, is in no manner limited to grinding only these components. Referring to FIG. 2, it will be seen that the grinding machine 10 is adapted to operate as a single grinding station with the ability to grind a variety of workpieces with only one tooling implement, grinding bit 20. The various grinding operations are automatically achieved by the coordinate efforts of a microprocessor (not shown), and a control unit (not represented pictorially). The database is comprised of a collection of manufacturing specifications for a variety of constant velocity universal joint models.

Referring again to FIG. 3, a means for controlling the motion of rotatable arm 58 is illustrated in part. In coordination with a microprocessor (not shown), a control unit (not represented pictorially) controls the motion of rotatable arm 58. The control unit sends and receives signals to or from some or all of the moving parts illustrated in FIG. 3. The information in the database is used to program into the control unit the pattern through which the workpiece 30 moves in relation to the replaceable grinding bit 20 during the grinding operation. In a typical grinding operation, the control unit transmits and receives a series of signals which cause the compound grinding table 76, the grinder spindle 38, and the replaceable grinding bit 20 to be moved along the Y and/or Z axis and into their proper position, the rotatable arm 58 to be rotated into a starting position, the spindle 38 and means to pump coolant solution to the coolant delivery pipe 34, to be turned on, and the workpiece table 46 to advance towards the replaceable grinding bit 20 in the predetermined sequence and at predetermined intervals as required by the particular type and size of the constant velocity universal joint component being reground.

Figure 18:
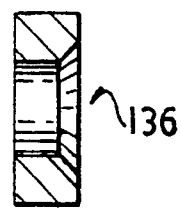
FIG. 18 is a sectional view of the outer race spacer.

Referring again to FIGS. 2 and 3, and by way of illustration, the following discussion illustrates one preferred procedure for regrinding outer race 112 (see FIG. 5) of the Rzeppa constant velocity universal joint 130 (see FIG. 5). The workpiece 30 is inserted into the indexer and chuck mechanism 60 using an adaptor/spacer 68 such that the center of the radius of tracks 120 (shown in FIG. 5) is directly and precisely over the center of rotation of the rotatable arm 58. Outer race spacer 136 (shown in FIG. 18) is the preferred adaptor/spacer 68 for this component. Indexer and chuck mechanism 60 is loosely closed around the splined output shaft 124 (see FIG. 4) of the outer race 112 in order to permit the turning of the outer race 112 in the indexer and chuck mechanism 60. A dial indicator (not shown pictorially), or another means (such as the horizontal alignment adaptor 138 shown in FIG. 21) is then used to locate and position the central axis of two opposite tracks 120 in precise alignment horizontally with the center line 102 of grinding bit 20 (see FIG. 27) along the Z-axis as the outer race 112 is oriented in the loosened indexer and chuck mechanism 60. The mechanism 60 is then tightened and the horizontal alignment adaptor 138 is then removed to enable the grinding operation to begin.

The workpiece table 46 is moved along the X axis, as is indicated by double-headed arrows 52 and 54, until it is close enough to the grinding bit 20 that the workpiece is near the head of such bit. Thereafter, the compound grinding table 76 is moved in the direction of arrows 90/92 (in the Z axis) and/or in the direction of arrows 96/98 (in the Y axis), if and as necessary, to position the spindle 38 and the grinding bit 20 so that the head of grinding bit 20 will engage the radial circular track 120 of workpiece 30. It is desired that the head of the grinding bit 20 be at a point which will grind the proper depth into the outer race 112 as the outer race is rotated around the tip of the grinder bit. Upon initiation of the automatic grinding sequence regulated by the control unit, the position of the outer race 112 is automatically rotated slowly around the center of rotation of the rotatable arm 58 with the grinding bit 20 rotating at high speed until the grinding bit has traveled forward and back through a given arc into the track 120 of the outer race 112.

Figure 8:
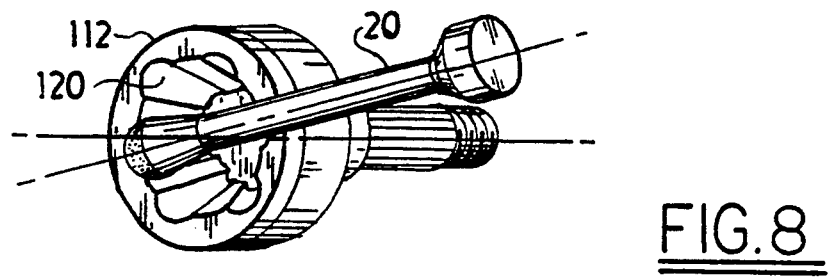
FIG. 8 is a schematic perspective view of the workpiece and grinding bit 6 of the assembly of FIG. 1, with the outer race component of the Rzeppa constant velocity joint mounted for grinding and shown in the starting position.
Figure 9:
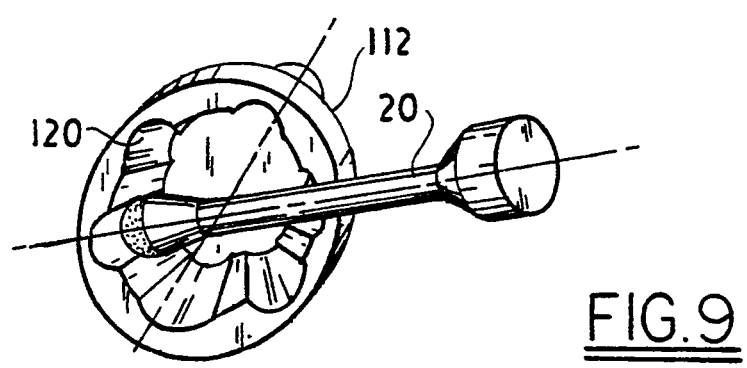
FIG. 9 is a schematic perspective view of the assembly of FIG. 8, shown midway through the grinding process.
Figure 10:
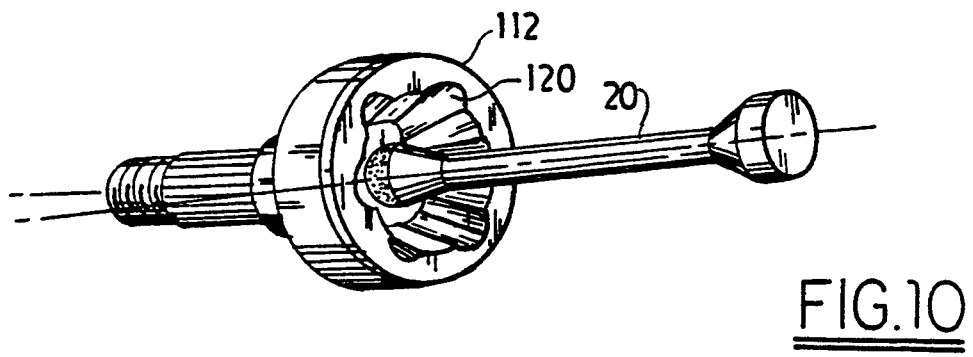
FIG. 10 is a schematic perspective view of the assembly of FIG. 8, shown at the innermost position.

This process for regrinding one of the tracks of the outer race 112 of the Rzeppa joint is further illustrated by FIGS. 8, 9, and 10. FIG. 8 is a schematic perspective view with outer race 112 of the Rzeppa constant velocity joint 130 mounted for grinding with grinding bit 20 in the starting position. FIG. 9 shows outer race 112 and grinding bit 20 midway through the grinding process. FIG. 10 illustrates the grinding at the innermost position. Once this process is completed, the workpiece 30 is then returned to its starting position with the head of the grinding bit in front of the outer race 112.

To regrind the next groove, the control unit transmits a signal to the indexing and chuck mechanism 60 to increment the position of the outer race 112 about the center axis of the workpiece 30, as indicated by arrow 70 (see FIG. 2) until the next track 120 of the outer race 112 is sequentially placed into position engaging the grinding bit 20, and then the procedure illustrated in FIGS. 8, 9, and 10 is repeated. The complete grinding sequence is repeated until all tracks have been ground identically and precisely to exacting tolerances.

In view of the fact that the features of the various constant velocity universal joints vary, the grinding procedures need to be varied also. This requirement poses no problem for the grinding machine 10 because, based on the data input by the grinding machine operator, the appropriate grinding procedure can easily be determined and relayed to the grinding machine 10 through the microprocessor and the control unit.

Figure 11:
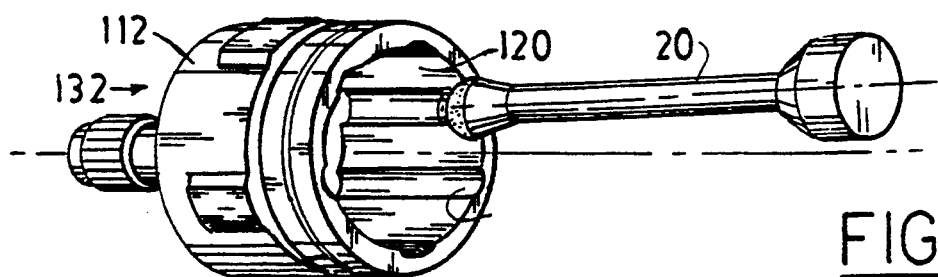
FIG. 11 is a schematic perspective view of the workpiece and grinding bit with the outer race component of the In-Line constant velocity joint, mounted for grinding and shown in the starting position.
Figure 12:
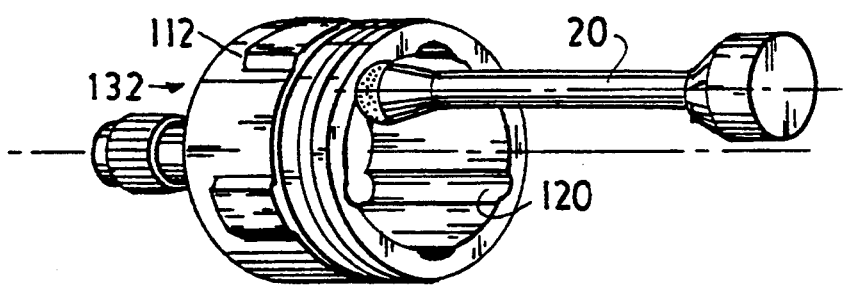
FIG. 12 is a schematic perspective view of the assembly of FIG. 11, shown in the innermost position.

By way of further illustration, in order to regrind race 112 (see FIG. 6) and/or other components of the In-Line constant velocity universal joint 132, the rotatable arm 58 is moved into engagement with the workpiece and locked into place, with the grooves 120 precisely in line with the grinding bit 20. The workpiece 30 is then advanced to the grinding bit 20 and slowly advanced forward to allow the grinding bit 20 to regrind each track 120 in a fashion similar to that used in the regrinding of the Rzeppa constant velocity joint 130 (see FIG. 5) except that the rotatable arm 58 does not rotate during the grinding operation. This procedure is illustrated in FIGS. 11 and 12. Referring to FIG. 11, grinding bit 20 is in its starting position, with outer race 112 mounted for regrinding. FIG. 12 illustrates outer race 112 and grinding bit 20 during regrinding at the innermost position. Once these procedures are completed, the outer race 112 is then indexed in order to put the next track 120 in position for regrinding. The inner race 114 (see FIG. 15) is reground in a similar manner.

By way of further illustration, in order to enable regrinding of the internal components of a Skewed Groove Disk constant velocity universal joint 134 (see FIG. 7), the grinding machine 10 (see FIG. 3) is modified to include a means to lock the rotatable arm 58 in an angular position (not shown pictorially) in order to effectuate regrinding. The locking means first sets the rotatable arm 58 in a position wherein the alternating clockwise grooves 120 (see FIG. 7) are precisely aligned to the centerline 102 of the grinding bit 20 along the Y axis; this first set of alternating clockwise tracks are ground with the spindle 38 and the grinding bit 20 disposed above the centerline 104 (see FIG. 27) of workpiece 30.

Once this first set of alternating tracks 120 have been ground, the spindle 38 and the grinding bit 20 are repositioned so that they are disposed below the centerline 104 of workpiece 30. Thereafter, the machining of alternating counterclockwise tracks 120 commences, until these other alternating tracks have been ground.

In this embodiment, the locking means preferably comprises a pneumatically operated solenoid (not shown in the Figures) which is located beneath the rotatable arm 58 and the workpiece table 46 and which, when operated, causes a pin to be forced into one of several precisely located receptacles (not shown) on the underside of the rotatable arm 58; an electrical position sensing device (such as e.g., a magnetically operated electrical switch), also not shown, senses both the motion and the relative position of the rotatable arm 58 and transmits signals to the control device.

Figure 13:
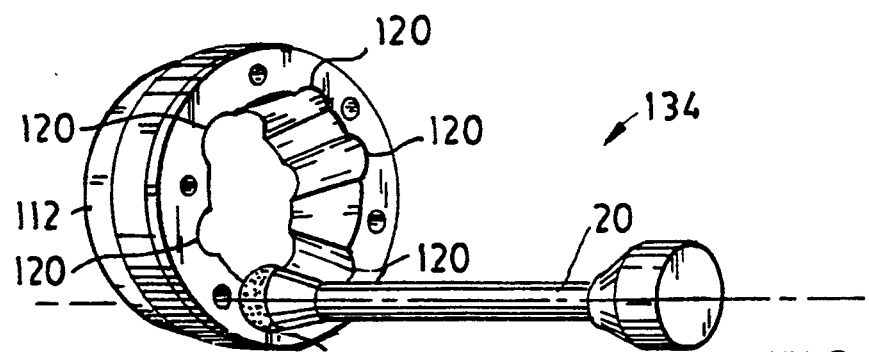
FIG. 13 is a schematic perspective view of the workpiece and grinding bit with the outer race component of the Skewed Groove Disk constant velocity joint, mounted for grinding and shown with the grinding bit in the starting position for the right skewed groove.
Figure 14:
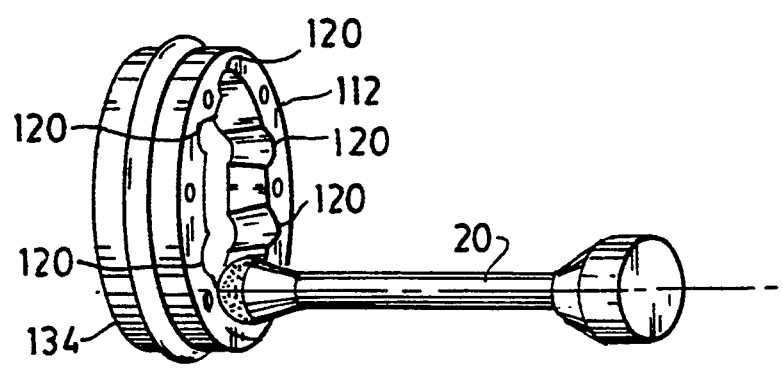
FIG. 14 is a schematic perspective view of the workpiece and grinding bit with the outer race component of the Skewed Groove Disk constant velocity joint, mounted for grinding and shown with the grinding bit in the starting position for the left skewed groove.

The process for regrinding outer race 112 (see FIG 7) of the Skewed Groove Disk constant velocity universal joint 134 (see FIG. 7) is illustrated in FIGS. 13 and 14. FIG. 13 is a schematic perspective view of outer race 112 with grinding bit 20 in the starting position for regrinding clockwise skewed groove 120. FIG. 14 shows the grinding bit 20 in the starting position for counter-clockwise skewed groove 120.

As is illustrated in FIGS. 13 and 14, the outer race 112 of a Skewed Groove CV Joint 134 may be machined in the manner described above for the inner race 114.

By changing the adaptor/spacer 140 (see FIG. 19) with which the workpiece 30 is held in the indexer chuck mechanism 60 and repositioning the grinding bit 20 in relation to the workpiece 30, the inner race 114 for each constant velocity universal joint type can be ground using the same size grinding bit 20 that was used on each outer race 112.

Figure 15:
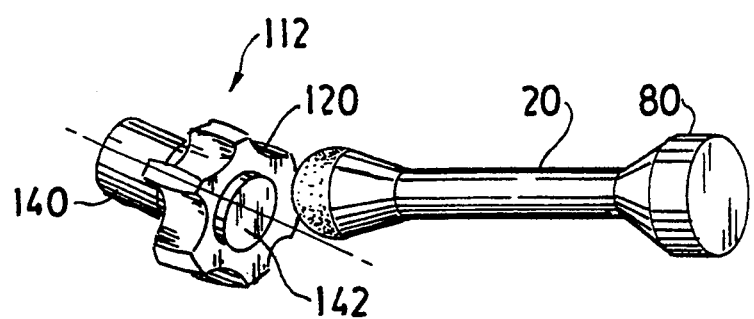
FIG. 15 is a schematic perspective view of the workpiece and grinding bit with the inner race component of the Rzeppa constant velocity joint mounted for grinding and shown in the starting position.
Figure 19:
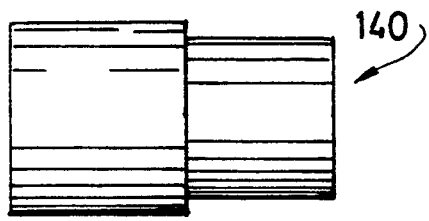
FIG. 19 is a plan view of the inner race spacer.
Figure 20:
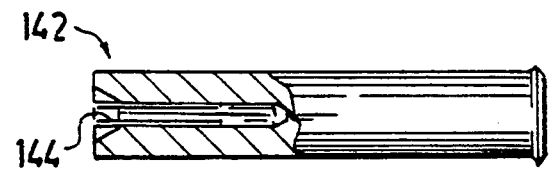
FIG. 20 is a sectional view of the inner race expanding mandrel.

FIG. 15 illustrates a process for grinding tracks 120 in inner race 112. The inner race 112 is inserted into the indexing and chuck mechanism 60 (shown in FIG. 3), using the appropriate workpiece adaptor 140 with an expanding mandrel 142 (see FIG. 20) in order to properly position the center of rotation of the inner race 114 directly and precisely over the center of rotation of the rotatable arm 58 during the grinding operation. The expanding mandrel 142 is tightly adjusted to lock the workpiece 30 onto the mandrel 142. In the preferred embodiment, the adaptor/spacer 140 is configured as illustrated in FIG. 19 as inner race spacer 140 which is disposed around the expanding mandrel 142 and the indexing and chuck mechanism 60. The preferred expanding mandrel 142 is designed as in FIG. 20 to be a slotted mandrel 142 with expansion screw 144 operating within. With the preferred adaptor/spacer 140 fixed to the workpiece 30, the indexing and chuck mechanism 60 is then loosely closed around the mandrel 142 holding the inner race 112 in order to permit the orientation of the inner race 112 and the mandrel 142. In the preferred embodiment illustrated, the horizontal alignment adaptor 138 (see FIG. 21) is used to locate and position the central axis of two opposite track 120 of the inner race 112 (see FIG. 15) to be precisely aligned horizontally with the centerline of the grinding bit 30 along the Z axis as the inner face 112 (shown in FIG. 15) is oriented in the loosened indexing and chuck mechanism 60. The chuck mechanism 60 is then tightened and the horizontal alignment adaptor 138 is removed to enable the grinding operation to begin. Next, the position of the grinding bit tip along the Y axis is adjusted in order to place the tip of the grinding bit 30 at the proper position so as to remove a known amount of material from the surface of the track 120 as the workpiece 30 is rotated by the rotatable arm 58. Upon completion of regrinding a track 120, the control unit (not shown) then transmits a signal to the indexing and chuck mechanism 60 to index the position of the workpiece 30 about the center axis 104 of the workpiece 30 until the next track 120 of the inner race 112 is sequentially placed into position for engaging the grinding bit 20. The grinding sequence is repeated until all tracks 120 have been ground identically. The grinding machine 10 can accommodate the regrinding of the inner races 112 of the In-Line and Skewed Groove Disk joints as well.

It has been found that if the inner race 112 is not ground to a specific tolerance, the constant velocity joint may seize under normal working conditions. In order to prevent seizing, the grinding bit should be at least about 0.005 of an inch greater than the size of the new bearing ball's diameter. In one embodiment, the new bearing ball's size of the original inner race grooves. These tolerance produce the appropriate clearances allowing the ball to actually move and not seize in the inner race groove.

Figure 16:
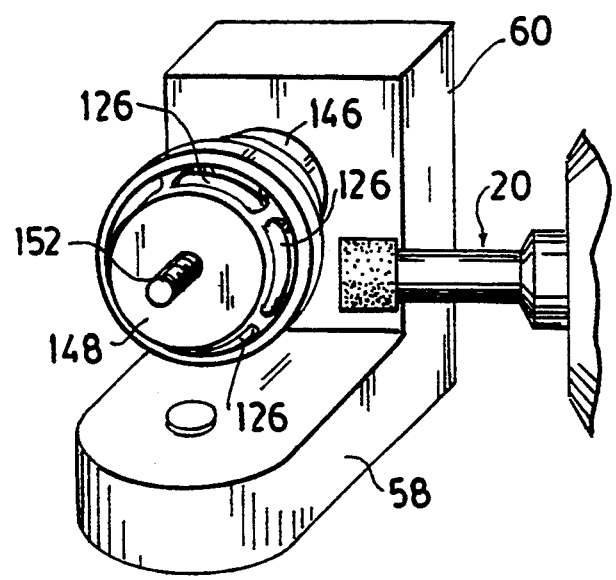
FIG. 16 is a schematic perspective view of the rotatable arm, the workpiece and the grinding bit with the intermediate bearing retainer mounted for regrinding.
Figure 17:
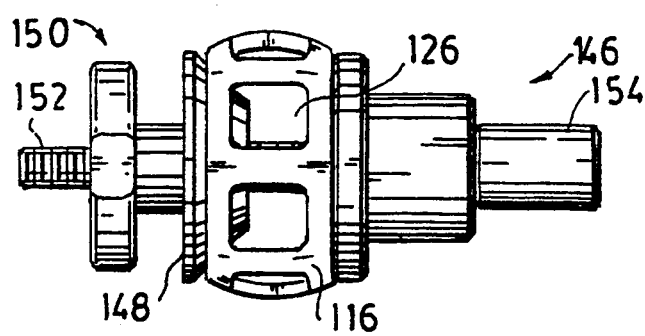
FIG. 17 is a plan view of the cage adaptor assembly.

FIG. 16 illustrates one preferred process for regrinding intermediate bearing retainer (cage) 116. The intermediate bearing retainer (cage) 116 is mounted in the indexing and chuck mechanism 60 by using an appropriate workpiece adaptor 146. An intermediate bearing retainer adaptor cover plate 148 and nut 150 is turned onto threaded concentric shaft 152 to clamp the intermediate bearing retainer 116 tightly between the adaptor 146 and the cover plate 148. The indexing and chuck mechanism 60 is tightly closed around the adaptor 146 and the intermediate bearing retainer 116. In one preferred embodiment, the adaptor is cage adaptor assembly 146 (shown in FIG. 17). As is illustrated in FIG. 17, the cage adaptor assembly 146 includes adaptor body 154 which mounts into the chuck mechanism 60 at one end and intermediate bearing retainer 116 at the other end. The intermediate bearing retainer 116 is sandwiched by adaptor box 154 and cone 148. Fast-lock knob 150 secures screw 152 through the cone 148, and intermediate bearing retainer 116 into the adaptor body 154 mounted into the chuck mechanism 60.

Referring to FIG. 16, rotatable arm 58 is positioned and locked perpendicularly to the central axis 102 of grinding bit 20. The center of opening 126 of the intermediate bearing retainer 116 is aligned with the centerline 102 of the grinding bit 20 along the Y and Z axis as the intermediate bearing retainer 116 is oriented within the adaptor 146. It is preferred to conduct such orientation by releasing the fast lock knob 150 and cone 148 slightly to thereby allow rotation of the intermediate bearing retainer 116 within the adaptor, by orienting the retainer 116, and then by retightening the fast lock knob 150.

To begin the grinding operation, and referring again to FIG. 3, the position of the workpiece table 46 is advanced slowly toward the grinding bit 20 until the grinding bit has penetrated the opening 126 in the intermediate bearing retainer 116 (see FIG. 17). The position of the grinding bit 20 along the Z axis is then adjusted to move the grinding bit up and down along the Z axis to grind both sides of the rectangular opening 126 in the intermediate bearing retainer 116. When the grinding operation has been completed, the workpiece table 46 (shown in FIG. 3) is moved away from the grinding bit 20, the indexing and chuck mechanism 60 is then indexed to position the next opening 126 in line with the grinding bit 20, and the operation is repeated until each of the six openings 126 has been ground.

Once all of the grinding operations are complete, the inner race 114, the outer race 112, the bearing balls 118 the intermediate bearing retainer 116, and rubber boot 128 (see FIG. 4) can then be reassembled in the same manner in which the original constant velocity universal joint was assembled.

In the machining of the original constant velocity joint, a keyway was built into the stock of the workpiece; the keyway is required for the alignment, the centering, and the precise locating of the workpiece for different operations during the original machining process. After the original grinding was completed, the keyway was ground off (see, e.g., the Kavthekar patent mentioned elsewhere in this specification); once such keyway has been removed, a CV joint cannot be reground on a machine designed for grinding original CV joints. Thus, in the regrinding procedure, there exists a need for an alternative means of aligning and centering the workpiece in the grinding machine.

Figure 21:
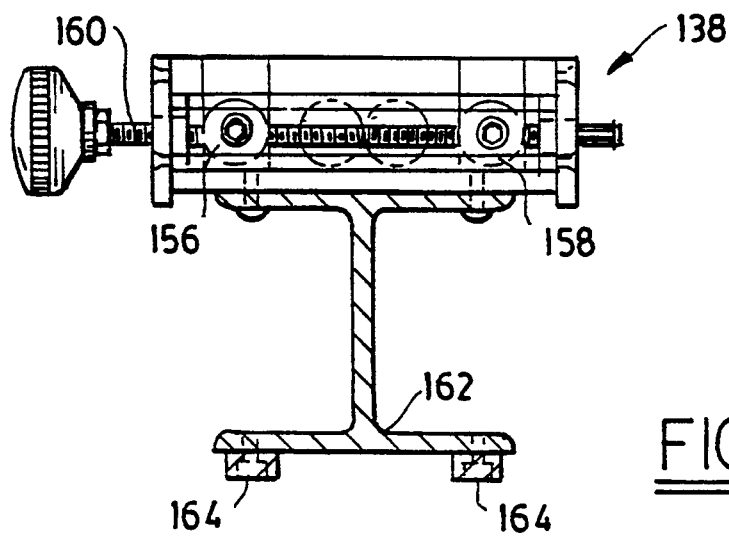
FIG. 21 is a perspective view of the horizontal alignment adaptor.

In one preferred embodiment, the means for aligning and centering the workpiece includes a means to accurately adjust the horizontal position of the workpiece in the indexing and chuck mechanism 60. This means is illustrated in FIG. 21. As will be apparent to those skilled in the art, the adaptor of FIG. 21 may be used with both an outer housing (such as outer housing 112 of FIG. 5) and/or an inner race (such as the inner race 114 of FIG. 5).

While grinding machine 10 has been illustrated for use with constant velocity universal joints, it will be understood that this machine may also be used with other workpieces where precisely controlled, accurate grinding is needed. A grinding bit 20 with a diameter larger than the diameter of the replacement bearing ball is preferred for accurate grinding.

Figure 22:
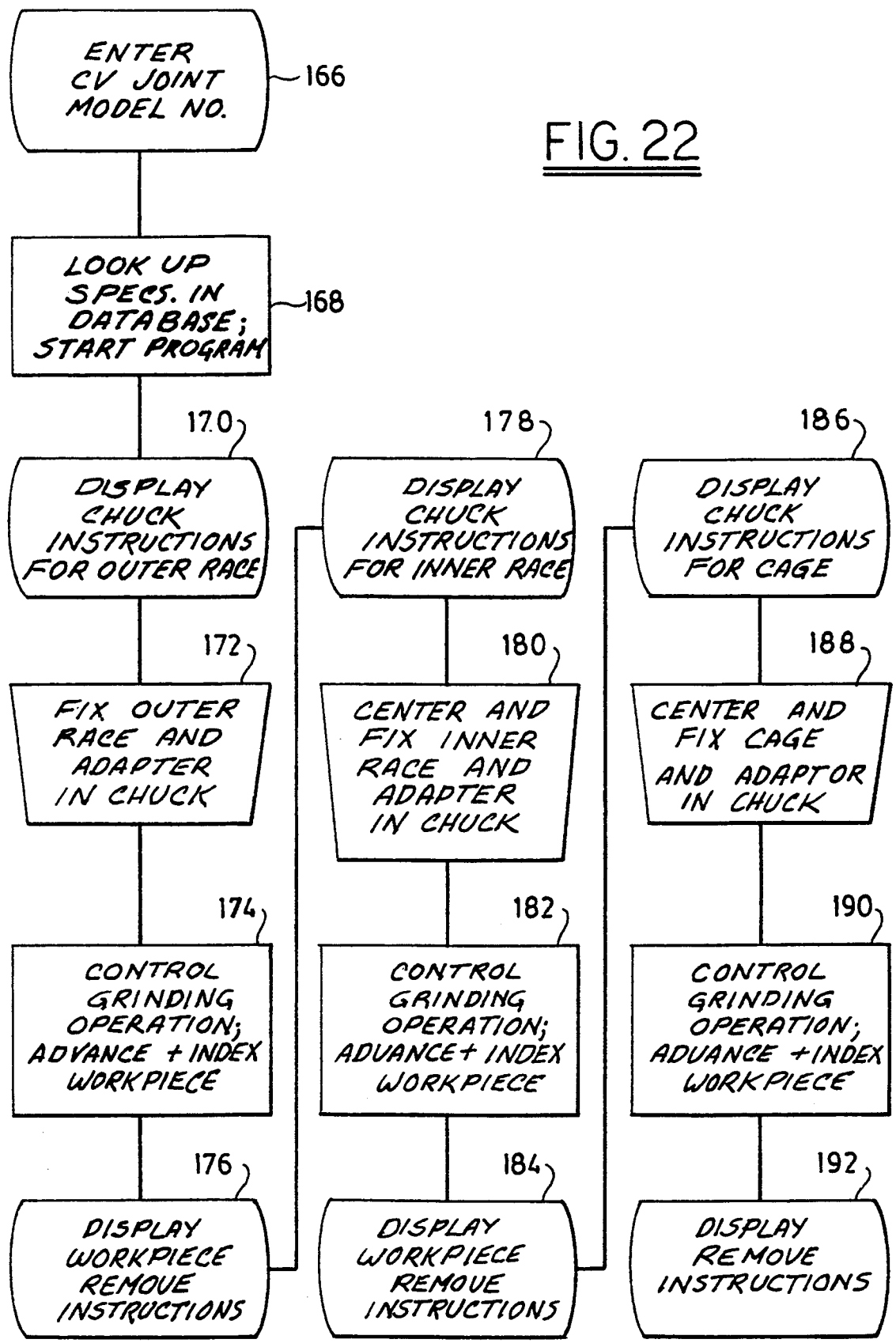
FIG. 22 is a flow chart illustrating computer controlled operations according to one preferred method of the invention.

FIG. 22 illustrates one preferred process of the invention. This preferred process is enabled by a microprocessor and sequential programming appropriate to the workpiece being ground based on an extensively compiled database of specifications for regrinding the wide variety of constant velocity universal joint configurations according to the many manufacturers, and models and years of cars from which they are removed for repair.

Referring to FIG. 22, and data entry block 166, the machine operator should enter model number information on the joint to be remanufactured into the control computer via a keyboard. In one preferred embodiment, this is an interactive procedure in which the microprocessor screen displays a series of questions and, using the keypad, the machine operator responds accordingly. Typical questions might relate to the manufacturer of the workpiece, the model type and year, and sizing.

Based upon the responses made by the operator, the dimensions of and other specifications of the particular joint to be operated upon are looked up in a database stored on appropriate computer memory media, and the proper program for grinding the workpiece is then selected in microprocessor operation 168. The cathode ray tube display screen (or other suitable display medium) will instruct the operator in display operation 170 as to how to chuck the outer race component in the chuck on the rotatable table, and the manual operation 172 must then be completed. Operating control function 174 will then detect the workpiece in position and enclosure locked, and the grinding operation rotational movement will be entirely controlled and directed by the preprogrammed instructions from the microprocessor according to the specifics of the workpiece dimensions, both controlling movement of the rotating table and chuck (and thus the workpiece into the grinding bit) and further indexing the workpiece to position each groove in relation to the grinding bit for sequential grinding operations until the entire part and all of the grooves have been worked. At completion, display operation 176 instructs the operator to remove the workpiece, and a similar operational sequence 178–184 is repeated for the inner race component. Thereafter, a similar operational sequence 186–192 is repeated for the intermediate bearing cage component.

Thus, the computer program automatically provides complete control and instructions according to the specific dimensions of any selected joint, and it precisely accomplishes the regrinding operations of each of three components by rotating the grinder table through the predetermined pattern of movement which grinds the grooves of the workpiece. Grinding is preferably controlled within a tolerance of at least about plus or minus one-thousandths of an inch.

Figure 23:
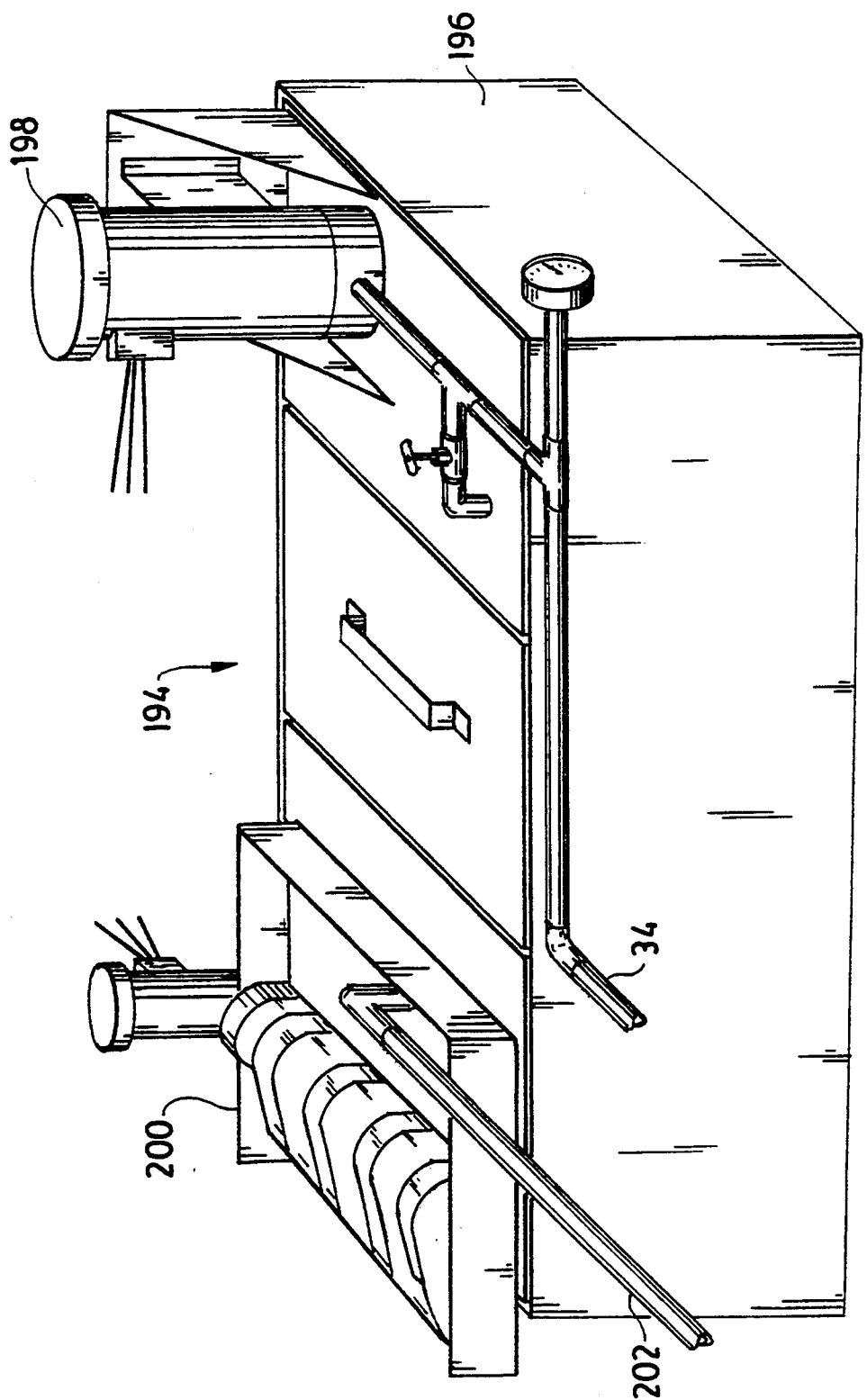
FIG. 23 is a perspective view of one cooling means of the machine of FIG. 1, illustrating the preferred coolant pump, tank, and filtration means.

One preferred embodiment of a cooling system 194 which may be used with grinding machine 10 is illustrated in FIG. 23. Referring to FIG. 23, it will be seen that cooling system 194 is preferably comprised of a coolant reservoir 196, a pump 198, a filter/cleaner system for purifying used coolant 200, a coolant delivery pipe 34 (also see FIG. 1), and a coolant return pipe 202.

Referring to FIG. 1, coolant is delivered through nozzle 22 and, after contacting the workpiece and/or the tool bit, is fed by gravity to a drain hole (see FIG. 2, element number 100). The spent fluid is then conveyed by gravity through drain pipe 202 (FIG. 23) to the reclaiming means 200.

Those skilled in the art are aware of many conventional means for reclaiming spent coolant; and these may be used in applicants' system. One preferred means is a coolant cleaner, model number CS-5-13, which is sold by Eriez Magnetics of Erie, Pennsylvania. As is described in Eriez's brochure 989-4M-BGG, this coolant cleaner is adapted to remove magnetic particles (such as steel filings generated during regrinding of a constant velocity joint) from contaminated lubricating fluid. In the operation of this cleaner, contaminated coolant fluid is preferably gravity fed to the cleaner where it flows under the magnetic roll of the cleaner. The roll's permanent magnetic field captures all of the ferrous contamination in the fluid. Because the roll surface rotates against the current flow, large and small ferrous particles clinging tightly to its surface are carried upward out of the liquid. Coolant fluid drains back down into the hopper of the machine as ferrous particles are removed by the scraper blade. Chips, grindings, and other contamination are scraped off the drum of the machine and deposited onto an inclined discharge lip which slopes down to a waiting receptacle. Clean coolant is then discharged form the bottom of the cleaner and returned to the system for reuse.

Figure 25:
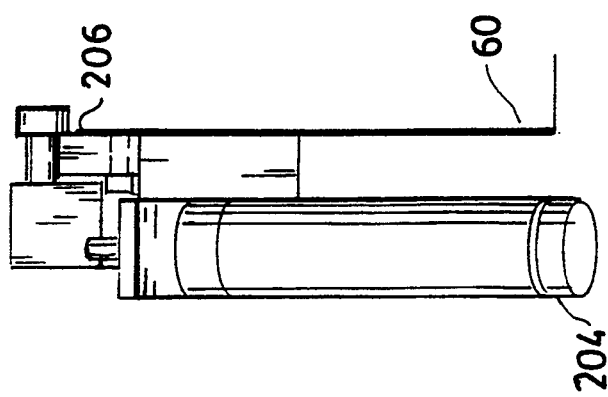
FIG. 25 is another perspective view of the indexing mechanism of FIG. 24.
Figure 24:
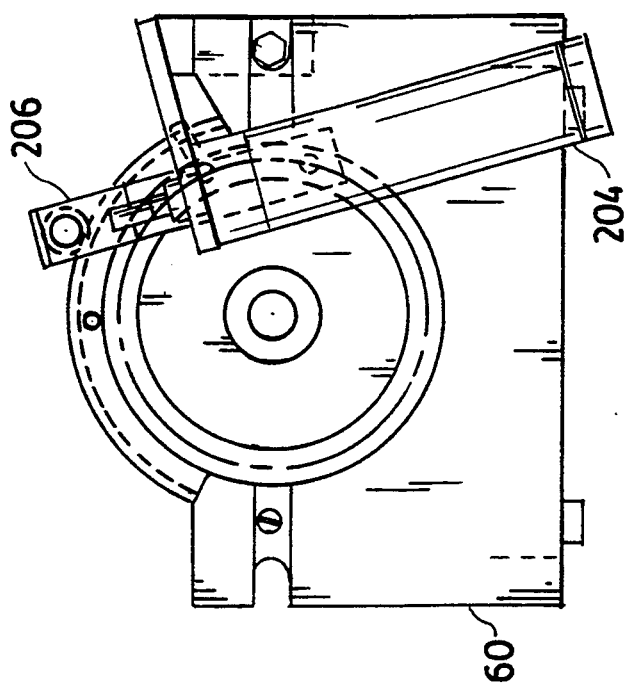
FIG. 24 is a perspective view of one preferred indexing mechanism of the machine of FIG. 1, which automatically indexes the workpiece in the machine during operation.

One preferred means for indexing workpiece 30 is illustrated in FIGS. 24 and 25. Referring to FIG. 24, it will be seen that the indexing cylinder 204 is a pneumatic cylinder which is operatively connected to a control unit (not shown). Cylinder 204 is attached to indexing linkage 206, which translates linear motion from cylinder 204 into rotary motion of indexing and chuck mechanism 60. FIG. 25 is a side view of the mechanism of FIG. 24.

Figure 26:
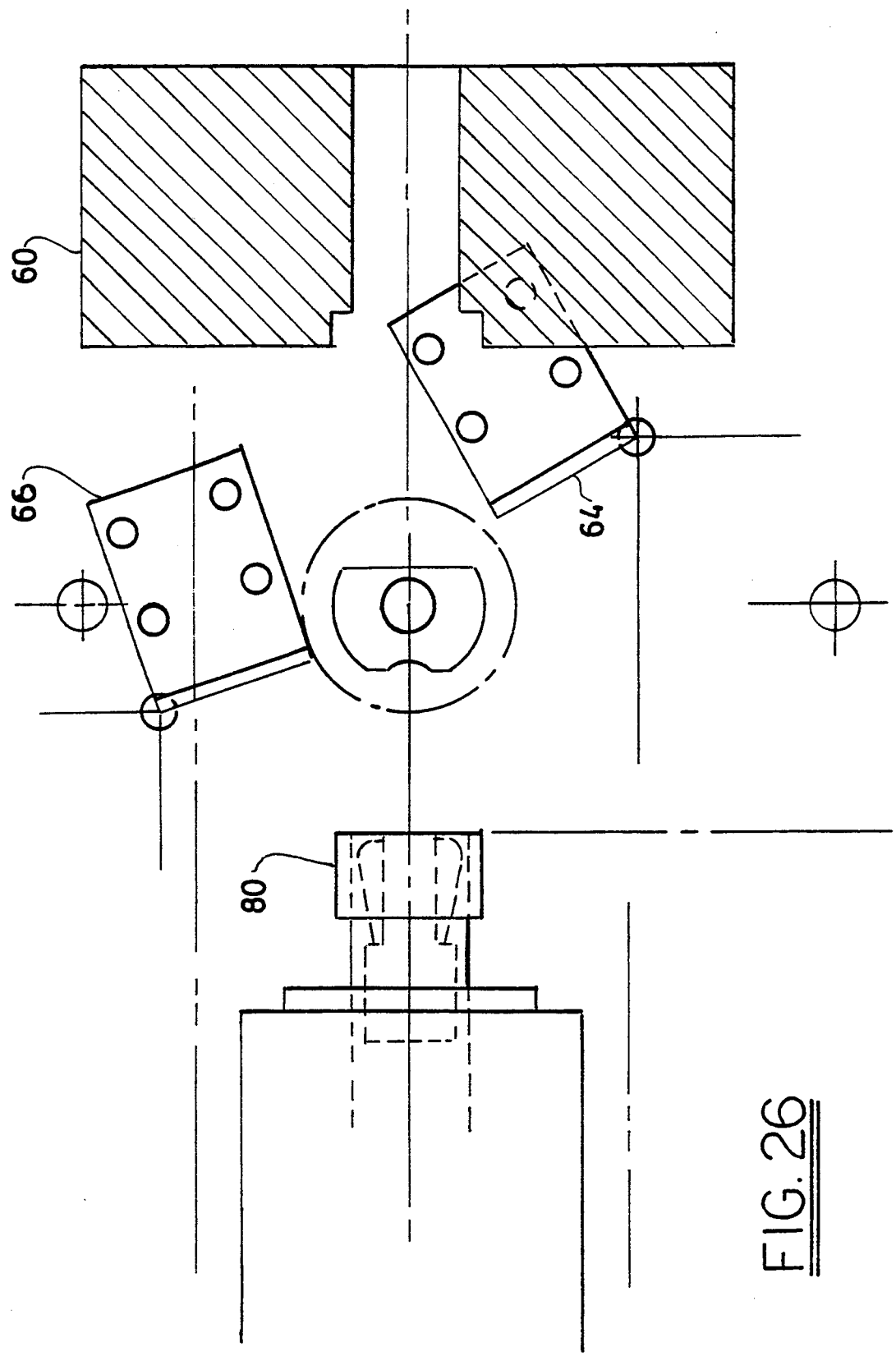
FIG. 26 is a partial sectional view of the machine of FIG. 1 illustrating the relative positions of the spindle, the chuck, and touch off blocks during one portion of the machine's operation.

FIG. 26 illustrates the preferred spatial relationships of various components of grinding machine 10 (when the rotatable arm 58 is in one extreme of rotation, as depicted in FIG. 3) between spindle collet 80, touch-off blocks 64 and 66, indexing and chuck mechanism 60, and the centerline of rotation of rotatable arm 58 (not shown).

FIGS. 27, 28, 29, and 30 illustrate the relationship between the grinding bit 20, the indexing and chuck mechanism 60, the outer race 112, the outer race spacer 62, and the rotatable arm 58 and various angles 106 which the rotatable arm 58 makes with the centerline 102 of the tool bit 20 as rotatable arm 58 rotates from one extreme position (75 degrees) to another extreme position (0 degrees) during the grinding cycle of an outer race 112. FIGS. 27, 28, 29, and 30 illustrate degrees of rotation of 75 degrees, 60 degrees, 30 degrees, and 0 degrees, respectively.

FIGS. 31, 32, 33, 34, and 35 illustrate the relationship between the grinding bit 20, the indexing and chuck mechanism 60, the inner race 114, the inner race spacer 136, and the rotatable arm 58 and various angles 106 which the rotatable arm 58 makes with the centerline 102 of the tool bit 20 as rotatable arm 58 rotates from one extreme position (0 degrees) to another extreme position (90 degrees) during the grinding cycle of an inner race 114. FIGS. 31, 32, 33, 34, and 35 illustrate degrees of rotation of 0 degrees, 30 degrees, 45 degrees, 60 degrees, and 90 degrees, respectively.

In one preferred embodiment, illustrated in FIGS. 36 and 37, a preferred grinding bit 20 is illustrated. Applicants have discovered that, in this embodiment, it is essential that grinding bit 20 be comprised of two separable parts which are removably connected to each other.

Referring to FIG. 36, it will be seen that the preferred grinding bit 30 is comprised of arbor 208, and replaceable grinding tip 210. As indicated elsewhere in this specification, the surface 212 of grinding tip 210 is coated with a thin (preferably single grain depth) layer of cubic boron nitride. In one preferred embodiment, the cubic boron nitride s electroplated onto a steel blank using a nickel medium.

The blank 214 of grinding tip 210 onto which the boron nitride coating is plated is preferably steel (or other suitable alloy with appropriate mechanical properties which can be plated with the boron nitride). The steel used most preferably will be a high-quality medium- or high-carbon steel. These steels are well known to those skilled in the art and are described, e.g., on pages 23-54 to 23-58 of Robert H. Perry and Cecil H. Chilton's "Chemical Engineers' Handbook," Fifth Edition (McGraw-Hill Book Company, New York, 1973).

Although the grinding tip 210 is preferably comprised primarily of steel, one cannot use a grinding bit 20 which, except for the coating on the grinding tip 210, consists essentially of steel. Although at least about 95 weight percent (and preferably at least about 97 weight percent) of the grinding tip is comprised of steel, the grinding tip must be coated with cubic boron nitride. Applicants have discovered that the use of such a grinding bit 20 without the boron nitride coating often causes intense and destructive chattering and vibration problems during the high speed (in excess of 35,000 r.p.m.) operation of the grinding bit.

Applicants have unexpectedly discovered that, if grinding bit 20 is constructed from two dissimilar pieces in a specified manner, a grinding bit 20 which does not exhibit the chattering and vibration problems of the integral grinding bit is produced.

In applicant's improved grinding bit 20, a grinding tip 210 and an arbor 208 are configured so that the arbor fits tightly within an interior cavity 216 of the grinding bit tip 210. Referring to the embodiment illustrated in FIG. 37, this tight fit may be achieved by precisely matching tapered surfaces 218 and 220. Because of such precise matching, the centerline 222 of arbor 208 is precisely aligned with the centerline 224 of grinding tip 210 in each and every plane.

In addition to such precise alignment, applicants have also discovered that, unlike grinding tip 210, arbor 208 preferably should consist essentially of a metal carbide. In one preferred embodiment, the metal carbide used in arbor 208 is selected from the group consisting of titanium carbide, tungsten carbide, chromium carbide, and mixtures thereof.

Referring again to FIG. 36, it will be seen that the overall length 226 of grinding bit 20 is from about 2.0 to about 4.75 inches.

Referring again to FIG. 37, it will be seen that the overall length 228 of arbor 208 is from about 2.2 inches to about 4.2 inches. The overall length 230 of grinding tip 210 may vary but generally is from about 1.0" to about 1.3".

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

Thus, the present invention is not limited to the procedures set forth above. The grinding machine 20 has been designed to be programmed to operate on various sizes and shapes of workpieces; and, as such, the process for grinding a specific component may deviate from that which was discussed above while still retaining the essence of the invention, which allows the entire remanufacturing operation.

The regrinding machine disclosed herein provides for a self-contained means of automatically regrinding the various components of a variety of constant velocity universal joints. The single station regrinding machine of this invention can regrind any component with a single piece of tooling, a grinding bit.

We claim:

1. A machine for regrinding a component part of a constant velocity universal joint, said constant velocity universal joint having ball bearings, an outer housing with an outer ball race member and an inner ball race member, said members provided with curved ball receiving grooves, and a ball cage between said members having ball containing grooves, comprising:
   (a) means for holding said component part, comprising a chuck mechanism and an adaptor for mounting said component in said chuck mechanism;
   (b) a grinding bit comprised of a grinding tip, wherein said grinding tip comprises boron nitride and consists essentially of a steel blank coated with cubic boron nitride;
   (c) rotatable support means for supporting said chuck mechanism, wherein said rotatable support means is comprised of means for disposing said component part contacts said grinding tip of said grinding bit in such a manner that said tip contacts said surface at a specified angle of incidence;
   (d) means for rotating said rotatable support means in order to change said angle of incidence between said grinding tip and said surface of said component part;

(e) a motorized grinding tool comprised of said grinding bit, wherein said grinding bit has a head larger than the diameter of the original ball bearings;

(f) means for adjusting the position of said motorized grinding tool in the Z axis to move said motorized grinding tool up and down;

(g) means for adjusting the position of said motorized grinding tool in the Y axis to move said grinding tool in and out;

(h) a lubricating fluid injection system for lubricating said component part and said grinding tool during the grinding operations; and (i) a protective enclosure surrounding the grinding machine components for containing lubricating fluid during grinding operations.

2. The machine as recited in claim 1, wherein said grinding bit is comprised of an arbor which consists essentially of metal carbide.

3. The machine as recited in claim 1, wherein said machine is comprised of spindle means for rotating said grinding bit at a speed of at least 35,000 revolutions per minute.

4. The machine as recited in claim 1, wherein said machine is comprised of means for locking said rotatable support means into a predetermined angular position.

5. The machine as recited in claim 1, wherein said machine is comprised of means for determining and fixing the position of said grinding bit with regard to said rotatable support means.

6. The machine as recited in claim 1, wherein said machine is comprised of horizontal alignment adaptor means for aligning a constant velocity joint.

7. The machine as recited in claim 1, wherein said machine comprises a hose and nozzle arrangement which includes a supply conduit for washing away any grinding residue from the grinding machine and the workpiece.

8. The machine as recited in claim 1, wherein said machine is comprised of an electrical positioning sensing device which senses both the motion and the relative position of said rotatable support means and transmits signals to said means for controlling the motion of said rotatable support means.

9. The machine as recited in claim 1, wherein said machine is comprised of a cage adaptor assembly comprising an adaptor body, a cone, and a fast-lock knob.

10. The machine as recited in claim 1, wherein said machine is comprised of an outer race spacer.

* * * * *